(12) United States Patent
Smith

(10) Patent No.: US 10,380,712 B2
(45) Date of Patent: Aug. 13, 2019

(54) GRAPHICS PROCESSING

(71) Applicant: ARM Limited, Cambridge (GB)

(72) Inventor: Raymond Morris Smith, Cambridge (GB)

(73) Assignee: Arm Limited, Cambridge (GB)

( * ) Notice: Subject to any disclaimer, the term of this patent is extended or adjusted under 35 U.S.C. 154(b) by 21 days.

(21) Appl. No.: 15/418,525

(22) Filed: Jan. 27, 2017

(65) Prior Publication Data

US 2017/0236243 A1 Aug. 17, 2017

(30) Foreign Application Priority Data

Feb. 11, 2016 (GB) .................................. 1602487.9

(51) Int. Cl.
- G06T 1/20 (2006.01)
- G06T 1/60 (2006.01)
- G06F 16/80 (2019.01)

(52) U.S. Cl.
CPC ................ G06T 1/20 (2013.01); G06F 16/80 (2019.01); G06T 1/60 (2013.01)

(58) Field of Classification Search
CPC ........ G06T 1/20; G06T 1/60; G06F 17/30908
See application file for complete search history.

(56) References Cited

U.S. PATENT DOCUMENTS

| 2009/0063795 | A1  | 3/2009  | Yueh      |             |
|--------------|-----|---------|-----------|-------------|
| 2011/0158522 | A1* | 6/2011  | Tsujii    | H04N 1/56   |
|              |     |         |           | 382/166     |
| 2012/0191667 | A1* | 7/2012  | Kopylovitz| G06F 3/0608 |
|              |     |         |           | 707/692     |
| 2015/0379684 | A1* | 12/2015 | Ramani    | G06T 1/60   |
|              |     |         |           | 345/531     |

FOREIGN PATENT DOCUMENTS

| WO | WO2014/022110 | 2/2014 |
| WO | WO2014/028120 | 2/2014 |

OTHER PUBLICATIONS

GB Combined Search and Examination Report dated Jul. 7, 2016, GB Patent Application No. GB1602487.9.

\* cited by examiner

*Primary Examiner* — William A Beutel
(74) *Attorney, Agent, or Firm* — Vierra Magen Marcus LLP

(57) ABSTRACT

A graphics processing system comprises a memory that stores graphics data. The graphics data stored in the memory is accessible using virtual memory addresses that map to physical memory addresses in the memory. The graphics processing system further comprises page merging circuitry configured to use metadata provided for a set of graphics data to determine whether any pages of the set of graphics data are similar to each other. The pages of the set of graphics data that are determined as being similar to each other are merged by mapping the virtual memory addresses for those pages to the same physical memory address in the memory. The page merging process can provide a way to reduce the number of physical memory addresses needed to store the pages of the set of graphics data in the memory.

19 Claims, 13 Drawing Sheets

GRAPHICS PROCESSING

BACKGROUND

The technology described herein relates to graphics processing methods and systems in which graphics data stored in memory is accessible using virtual memory addresses that map to physical memory addresses in the memory.

In order to access graphics data stored in memory, many graphics processing systems use virtual memory addressing arrangements. In these arrangements, the address used in a given memory access request is translated from a virtual memory address used by the unit requesting the memory access to a corresponding physical memory address in memory. To perform the translation between the virtual memory address used for a memory access request and the corresponding physical memory address where the graphics data is actually stored, a set of address translation data, which maps virtual memory addresses used in memory access requests to corresponding physical memory addresses, is usually stored.

Memory accesses are typically performed in a memory management unit (MMU) of the graphics processing system. The MMU usually allocates the physical memory for graphics data storage in given units of memory size, typically referred to as "pages", and associates corresponding virtual memory addresses for the pages with the physical memory addresses where the page of graphics data is actually stored in memory. Thus, the memory address translation data is typically provided by an MMU and is usually in the form of a so-called "page table".

As will be appreciated, using virtual memory addresses provides a level of abstraction that can, for example, allow different units of the graphics processing system to access the graphics data stored in a shared main memory using their own sets of virtual addresses whilst allowing the MMU to maintain the integrity (e.g. prevent inadvertent overwrites or deletions) of the graphics data that is stored at the physical memory addresses of the memory.

The Applicants believe that there remains scope for improvements to graphics processing methods and systems in which graphics data stored in memory is accessible using virtual memory addresses that map to physical memory addresses in the memory. For example, in graphics processing systems, e.g. of portable devices, it is generally desirable to try to reduce the amount of memory required to store sets of graphics data and/or to try to increase efficiency, e.g. so as to reduce power consumption and/or increase processing speed, but without a corresponding undesirable reduction in the quality or resolution of the graphics data.

BRIEF DESCRIPTION OF THE DRAWINGS

Various embodiments of the technology described herein will be described by way of example only and with reference to the accompanying drawings, in which.

Figure 1:
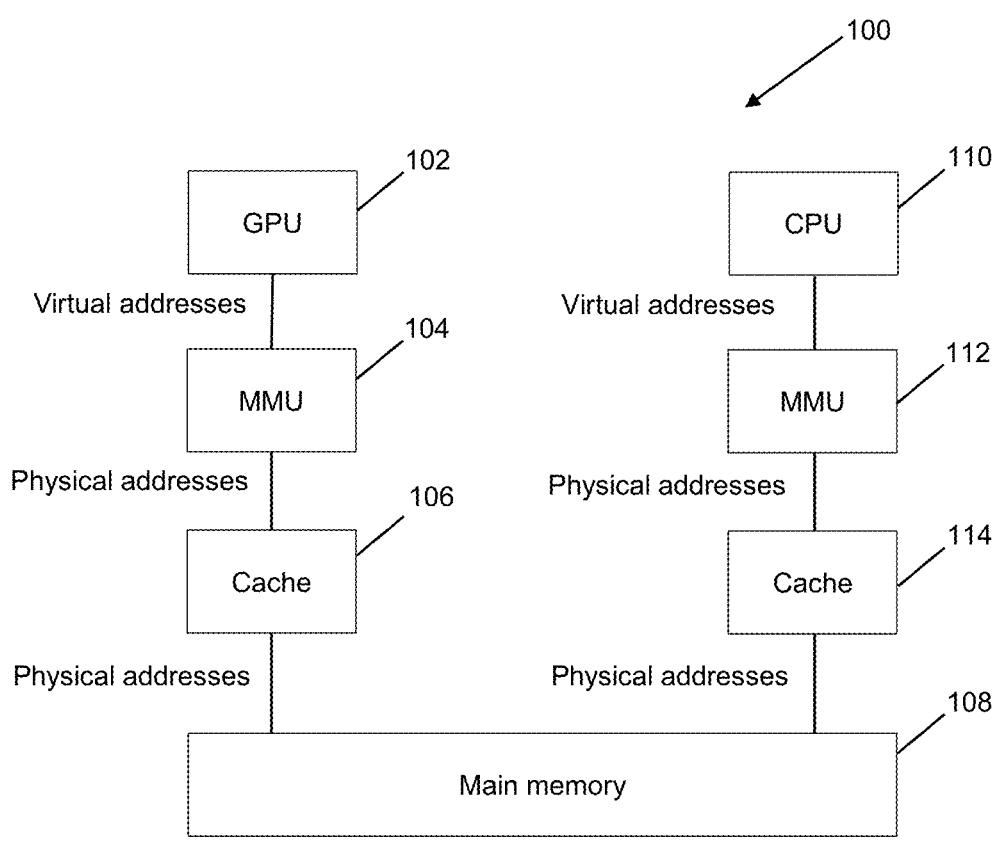
FIG. 1 shows an overview of a graphics processing system according to embodiments of the technology described herein.

The drawings show elements of a graphics processing system that are relevant to embodiments of the technology described herein. As will be appreciated by those skilled in the art there may be other elements of the graphics processing system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

An embodiment of the technology described herein comprises a method of operating a graphics processing system comprising:
  determining whether a page of a set of graphics data stored or to be stored in a memory of the graphics processing system is similar to a stored page of the set of graphics data stored in the memory; and
  when a particular page of the set of graphics data stored or to be stored in the memory is determined as being similar to a particular stored page of the set of graphics data stored in the memory, mapping a virtual memory address for the particular page to the same physical memory address as the particular stored page.

Another embodiment of the technology described herein comprises a graphics processing system comprising:
  a memory configured to store graphics data;
  memory management unit circuitry configured to access pages of graphics data stored in the memory using virtual memory addresses that map to physical memory addresses in the memory; and
  page merging circuitry configured to:
    determine whether a page of a set of graphics data stored or to be stored in the memory is similar to a stored page of the set of graphics data stored in the memory; and when a particular page of the set of graphics data stored or to be stored in the memory is determined as being similar to a particular stored page of the set of graphics data stored in the memory, map a virtual memory address for the particular page to the same physical memory address as the particular stored page.

In the technology described herein, pages of graphics data stored in a (e.g. main) memory of a graphics processing system are accessible using virtual memory addresses that map to physical memory addresses for those pages. As discussed above, using virtual memory addresses in this way can, for example, help to maintain the integrity of the graphics data that is stored in the memory.

The Applicants have also recognised that plural pages of sets of graphics data often comprise similar (e.g. the same or substantially the same) graphics data as each other. For example, webpages and user interfaces typically comprise large regions that are all the same, e.g. background, colour and/or pattern, such that pages of the graphics data for those webpages and user interfaces are the same. This can mean that some of the virtual memory addresses for the pages of a set of graphics data may refer to similar pages of graphics data that are stored at respective physical memory addresses in the memory. This can lead to inefficient use of the memory since pages of similar graphics data may be stored multiple times at plural different physical memory locations.

The technology described herein comprises determining whether a page of a set of graphics data that is stored or to be stored in memory is similar to a stored page of the set of graphics data. When a particular page of the set of graphics data is determined as being similar to a particular stored page of the set of graphics data, a virtual memory address for the particular page is mapped to the same physical memory address as the particular stored page, e.g. rather than mapping the virtual memory address for the particular page to a unique physical memory address for the particular page. The particular page and the particular stored page may therefore have different virtual memory addresses that map to the same physical memory address. This process of mapping plural similar pages to the same physical memory address may be referred to herein as "page merging" and the pages that are merged may be referred to herein as "merged pages".

The technology described herein can therefore reduce the number of physical memory addresses that are needed for pages of similar graphics data stored in memory, but without affecting the virtual memory addresses used to access those pages. This can release physical memory addresses so that those physical memory addresses can be used to store other data in the memory. The technology described herein can accordingly result in an efficient use of memory since similar pages of a set of graphics data need not be retained in memory at multiple different memory locations.

The technology described herein can also reduce the amount of memory bandwidth (and, e.g., the amount of cache) that is needed in order to read plural pages of similar graphics data from memory, whilst still allowing the virtual memory addresses for those pages to be used. For example, where plural pages of similar graphics data are merged, and where those merged pages are later read from memory using respective virtual memory addresses for those pages, a single page of graphics data may be read (and, e.g., cached) from the single physical memory address that maps to the virtual memory addresses for the merged pages. The technology described herein can accordingly result in an efficient use of memory bandwidth (and, e.g., cache) since similar pages of a set of graphics data need not be read (and, e.g., cached) from multiple different memory locations.

It will be appreciated from the above that the Applicants have recognised that pages of graphics data are particularly suitable for page merging. This is because, as discussed above, pages of sets of graphics data often comprise similar (e.g. the same or substantially the same) graphics data as each other. However, pages of other types of data (i.e. non-graphics data) often do not comprise similar (e.g. the same or substantially the same) data as each other, and therefore often are not suitable for page merging. Indeed, the Applicants have identified that it can often be inefficient to use processing resources to consider pages of other types of data (i.e. non-graphics data) for page merging.

Thus, the step of determining whether a page of a set of graphics data stored or to be stored in the memory is similar to a stored page of the set of graphics data stored in the memory (and in an embodiment the method as a whole) may comprise considering only pages of graphics data for page merging and/or may not comprise considering pages of other types of data (i.e. non-graphics data) for page merging. Similarly, when determining whether a page of a set of graphics data stored or to be stored in the memory is similar to a stored page of the set of graphics data stored in the memory, the page merging circuitry (and in an embodiment the graphics processing system as a whole) may be configured to consider only pages of graphics data for page merging and/or may be configured not to consider pages of other types of data (i.e. non-graphics data) for page merging.

Furthermore, embodiments of the technology described herein may comprise using metadata provided for the set of graphics data to determine whether a page of the set of graphics data stored or to be stored in the memory is similar to a stored page of the set of graphics data stored in the memory. This use of metadata can, for example, make the process of determining whether pages of the set of graphics data are similar particularly efficient. For example, the use of metadata for the set of graphics data can avoid the need, for example, to consider the set of graphics data itself in order to merge pages.

For example, at least some of the metadata provided for the set of graphics data may be generated prior to at least some or all of the set of graphics data being generated and/or stored in memory, e.g. at least some of the metadata provided for the set of graphics data may be generated while the set of graphics data is being generated and/or at least some of the metadata provided for the set of graphics data may be generated while the set of graphics data is being copied, transferred and/or written to the memory. This can avoid the need, for example, to access and then reconsider the set of graphics data itself once it has been generated and/or stored in the memory.

As will be appreciated, what constitutes "similar" in embodiments of the technology described herein may be selected as desired. For example, in some embodiments it may be sufficient for two pages to be considered as being similar when they are substantially the same colour and/or pattern, e.g. when the pages have acceptable or visually imperceptible differences. In other embodiments, two pages may be considered as being similar only when they are identical.

The set of graphics data referred to herein may be provided or generated in any desired and suitable way. In some embodiments, at least some or all of the set of graphics data may have been previously generated, e.g. by a different graphics processing system, and thus embodiments need not comprise the graphics processing system generating at least some or all of the set of graphics data. In these embodiments, at least some or all of the generated set of graphics data may be provided (e.g. uploaded) to the graphics processing system for processing in the manner described herein. In other embodiments, the graphics processing system itself may generate some or all of the set of graphics data.

The graphics processing system that generates the set of graphics data may comprise central processing unit (CPU) circuitry configured to generate the set of graphics data, e.g. under the control of an application (computer program). The graphics processing system that generates the set of graphics data may also or instead comprise graphics processing unit (GPU) circuitry configured to generate the set of graphics data.

Generating the set of graphics data may comprise rendering surfaces of objects or features within a scene. Rendering the surfaces may comprise sub-dividing each surface into a number of geometric components. These geometric components may be defined by and represented as a set of points and/or vectors. These geometric components may be polygons, such as triangles, and therefore may be so-called "primitives". Each primitive may be defined by and represented as a set of points or "vertices". Each vertex for a primitive may have associated with it a set of vertex attribute data (such as position, colour, transparency, texture coordinate, etc.) indicating the properties of the primitive at that vertex. This vertex attribute data may be used, for example, when rasterising and rendering the primitives in order to generate the set of graphics data.

The graphics processing unit circuitry may comprise a graphics processing pipeline that generates the set of graphics data. The graphics processing pipeline may contain any suitable and desired graphics processing pipeline stages that graphics processing unit circuitry may contain, such as a vertex shader, a rasterisation stage, a rendering stage, a pixel processor stage, etc., in order to generate the set of graphics data.

The vertex shader of the graphics processing pipeline may generate and/or modify vertex attribute data for one or more primitives.

The rasterisation stage of the graphics processing pipeline may generate graphics fragments to be rendered, for example to generate rendered graphics data for sampling points of a desired graphics output (e.g. image or texture). Each graphics fragment that is generated by the rasterisation stage may have associated with it a set of sampling points of the graphics output and may be used to generate rendered graphics data for one or more sampling points of the set of sampling points associated with the fragment.

The rasterisation stage may be configured to generate the fragments for rendering in any desired and suitable manner. For example, the rasterisation stage may receive one or more geometric components or primitives to be rasterised, test those one or more geometric components or primitives against sets of sampling point positions, and generate fragments representing the geometric components or primitives accordingly.

The rendering stage may process fragments generated by the rasterisation stage to generate rendered graphics data for (covered) sampling points that the fragments represent. The rendering process may include, for example, one or more of fragment shading, blending, texture-mapping, etc. The rendering stage may be in the form of a programmable fragment shader.

The graphics processing pipeline may also contain any other suitable and desired processing stages that a graphics processing pipeline may contain such as an early depth (or an early depth and stencil) tester, a late depth (or a late depth and stencil) tester, a blender, etc.

The pixel processor stage may post-process, e.g. up sample, down sample, filter, etc., the rendered graphics data to generate the set of graphics data.

The set of graphics data may take any desired and suitable form. For example, the set of graphics data may comprise an array of data (e.g. sampling) positions for a desired graphics output (e.g. image or texture). The set of graphics data may correspond to all or part of a desired graphics output (e.g. image or texture). There may be any desired and suitable correspondence between the data positions and the output data positions (e.g. pixels or texels) of the desired graphics output. Thus, the data positions of the set of graphics data may each correspond to a pixel or pixels of an image or to a texel or texels of a texture.

The set of graphics data may be divided into subregions for generating, processing and/or storage purposes. In these embodiments, providing or generating the set of graphics data may comprise separately providing or generating respective subregions of the set of graphics data, e.g. in parallel and/or in series.

A subregion of the set of graphics data can be any desired and suitable size or shape in terms of data (e.g. sampling) positions, but may be linear (e.g. of unit height) or rectangular (including square). A subregion may be, e.g., 8×8, 16×16, 32×32 or 64×64 data positions in size. In some embodiments, a subregion may comprise or may be a processing tile or page that the desired output (e.g. image or texture) is divided into for generating, processing and/or storage purposes.

A subregion of the set of graphics data may have a different size and/or shape to a page of the set of graphics data that is stored or to be stored in memory. For example, a subregion of the set of graphics data may be rectangular (including square) (e.g. a tile or block) and a page of the set of graphics data which is stored or to be stored in memory may be linear (e.g. of unit height), or vice versa. Alternatively, a subregion of the set of graphics data may have the same size and/or shape as, or may be, a page of the set of graphics data that is stored or is to be stored in memory.

There may accordingly be any desired and suitable correspondence between the subregions of the set of graphics data and the pages of the set of graphics data that are stored or to be stored in memory. A subregion of the set of graphics data may therefore correspond to all or part of a page of the set of graphics data stored or to be stored in the memory, or vice versa. The correspondence may be fixed or variable. The correspondence may be indicated by a dependence between the subregions and the pages of the set of graphics data stored or to be stored in memory. The dependence may be stored in memory and/or determined in use, for example while the set of graphics data is being generated and/or while the set of graphics data is being copied, transferred and/or written to the memory.

In some embodiments, at least some or all of the set of graphics data may already be stored in the memory, and thus embodiments need not comprise copying, transferring and/or writing the set of graphics data to the memory. Other embodiments may comprise the graphics processing system copying, transferring and/or writing at least some or all of the set of graphics data to the memory. In these embodiments, at least some or all of the set of graphics data may be copied, transferred and/or written to the memory by the graphics processing unit (GPU) circuitry of the graphics processing system. Alternatively, at least some or all of the set of graphics data may be copied, transferred and/or written to the memory by the central processing unit (CPU) circuitry of the graphics processing system.

The set of graphics data may be copied, transferred and/or written to the memory using the memory management unit (MMU) circuitry of the graphics processing system. The set of graphics data may be copied, transferred and/or written to the memory via a cache of the graphics processing system. The graphics processing system may comprise memory management unit (MMU) circuitry and/or a cache for use by the graphics processing unit (GPU) circuitry and/or (different) memory management unit (MMU) circuitry and/or a (different) cache for use by the central processing unit (CPU) circuitry.

The set of graphics data may be copied, transferred and/or written to the memory subregion by subregion and/or page by page. The step of copying, transferring and/or writing the set of graphics data to the memory may effect a conversion from subregions of the set of graphics data to pages of the set of graphics data.

The set of graphics data may be stored in a buffer (e.g. a frame buffer) of the memory. The set of graphics data may be stored in a different memory (buffer) (e.g. a subregion or tile buffer of or for the graphics processing unit circuitry or an input buffer (e.g. in main memory) of or for the central processing unit circuitry) prior to being stored in the memory (buffer). The set of graphics data may then be transferred or copied from the different memory (buffer) to the memory (buffer).

As discussed above, embodiments of the technology described herein may comprise using metadata to determine whether a page of the set of graphics data stored or to be stored in the memory is similar to a stored page of the set of graphics data stored in the memory. The metadata for the set of graphics data may be provided or generated in any desired and suitable way.

In some embodiments, at least some or all of the metadata for the set of graphics data may have been previously generated, e.g. by a different graphics processing system, and thus embodiments need not comprise the graphics processing system generating at least some or all of the metadata for the set of graphics data. In these embodiments, at least some or all of the generated metadata for the set of graphics data may be provided to the graphics processing system for use in the manner described herein. Other embodiments may comprise the graphics processing system itself generating at least some or all of the metadata for the set of graphics data.

The graphics processing system that generates the metadata may comprise graphics processing unit (GPU) circuitry configured to generate the metadata for the set of graphics data. The graphics processing system that generates the metadata for the set of graphics data may also or instead comprise central processing unit (CPU) circuitry configured to generate the metadata for the set of graphics data.

In some embodiments, the metadata for the set of graphics data may comprise a set of signatures for the set of graphics data. Each signature may be representative of the contents of a subregion or page of the set of graphics data. The metadata, and therefore the set of signatures, may be stored in the memory and/or in another memory of the graphics processing system.

Generating the metadata for the set of graphics data may accordingly comprise generating a set of signatures for the set of graphics data. The graphics processing system may therefore comprise signature generating circuitry. The signature generating circuitry may form part of the graphics processing unit (GPU) circuitry and/or part of the central processing unit (CPU) circuitry.

The signature for a page may be, or may be generated from, a signature for each subregion corresponding to that page. The signature for a page may therefore be generated based on a dependence between the subregions and the pages of the set of graphics data, as discussed above.

The signature for a subregion or page may take any desired and suitable form that is representative of the contents of the subregion or page (i.e. of the data (e.g. colour) values of the data (e.g. sampling) positions of the subregion or page). The signature may comprise, for example, a data (e.g. colour) value, a checksum, a CRC, or a hash value, etc., derived from or generated for the data for the subregion or page in question. Suitable signatures can include standard CRCs, such as CRC32, or other forms of signature such as MD5, SHA-1, etc.

In embodiments, the signature for a subregion or page of the set of graphics data may comprise a data (e.g. colour) value for the subregion or page.

The data (e.g. colour) value for a subregion or page may be, when the subregion or page is substantially uniform or solid in terms of data (e.g. colour) values (i.e. has the same or substantially the same data (e.g. colour) value for each (e.g. all or substantially all) of the data (e.g. sampling) positions that the subregion or page includes), that uniform or solid data (e.g. colour) value.

Alternatively, when a subregion or page is not substantially uniform or solid in terms of data (e.g. colour) values (i.e. does not have the same or substantially the same data (e.g. colour) value for each (e.g. all or substantially all) of the data positions that the subregion or page includes), the data (e.g. colour) value for the subregion or page may be a reserved data (e.g. colour) value. The reserved data (e.g. colour) value may be a data (e.g. colour) value that is not often used, such as a transparent or semi-transparent colour value. The reserved data (e.g. colour) value may not be a data (e.g. colour) value that is used often, such as white or black and/or an opaque colour value.

Thus, in some embodiments, generating a signature for a subregion or page may comprise determining whether a subregion or page is substantially uniform or solid in terms of data (e.g. colour) values. In some embodiments, determining whether a subregion or page is substantially uniform or solid in terms of data (e.g. colour) values may comprise comparing a data (e.g. colour) value for each subsequent data (e.g. sampling) position of the subregion or page to a data (e.g. colour) value for a previous data position of the subregion or page. This process may continue until a selected number of data positions, for example the majority or substantially all of the data positions, of the subregion or page have been compared and/or until a data (e.g. colour) value for a subsequent data position of the subregion or page is found that is dissimilar to a data (e.g. colour) value for a previous data position of the subregion or page.

In these embodiments, it may be determined that the subregion or page is substantially uniform or solid in terms of data (e.g. colour) values when a data (e.g. colour) value for a subsequent data position of the subregion or page is not found that is dissimilar to a data (e.g. colour) value of a previous data position of the subregion or page. Conversely, it may be determined that the subregion or page is not substantially uniform or solid in terms of data (e.g. colour) values when a data (e.g. colour) value of a subsequent data position of the subregion or page is found that is dissimilar to a data (e.g. colour) value of a previous data position of the subregion or page. These embodiments may, for example, avoid the need to consider each and every data position of the subregion or page in order to generate the signature for that subregion or page.

As will be appreciated, what constitutes "dissimilar" in these embodiments may be selected as desired. For example, two data (e.g. colour) values may be considered as being dissimilar when they differ by more than a threshold amount. Alternatively, two data (e.g. colour) values may be considered as being dissimilar unless they are identical.

Generating the metadata may comprise generating a signature for each one of plural subregions or pages of the set of graphics data stored or to be stored in memory.

In some embodiments, the set of signatures may be generated while generating the subregions or pages of the set of graphics data. In these embodiments, the process of generating the subregions or pages may be interleaved with the process of generating the signatures for the subregions or pages. For example, a first subregion or page may be generated and a signature for the first subregion or page may be generated, then a second subregion or page may be generated and a signature for the second subregion or page may be generated, and so on.

The set of signatures may also or instead be generated while copying, transferring and/or writing the subregions or pages of the set of graphics data to the memory. In these embodiments, the process of generating the signatures for the subregions or pages may be interleaved with the process of copying, transferring and/or writing the subregions or pages to memory. For example, a signature for a first subregion or page may be generated and the first subregion or page may be copied, transferred and/or written to memory, then a signature for a second subregion or page may be generated and then the second subregion or page may be copied, transferred and/or written to memory, and so on.

The set of signatures may be stored in memory as an array of signatures for the set of graphics data. The array of signatures for the set of graphics data may be stored in a buffer of the memory. This buffer may be referred to herein as a "merge buffer".

In some embodiments, the metadata for the set of graphics data may also or instead comprise a record (e.g. a list) of stored pages of the set of graphics data known to be stored in the memory. The stored pages of the record may comprise pages that have previously been merged with another page and/or that have been determined as potentially being able to be merged with another page, e.g. because those pages are uniform or solid in terms of data (e.g. colour) values. The record of stored pages may comprise a record of pages of a particular type (e.g. in terms of signature or (uniform or solid) data (e.g. colour) value) known to be stored in the memory. This record of stored pages may be referred to herein as a "merged page record". The metadata, and therefore the merged page record, may be stored in the memory and/or in another memory of the graphics processing system.

The merged page record may contain a signature for each of the stored pages of the record. The signature may take any of the forms and/or may be generated in any of the ways described above. In some embodiments, the signature may be provided by the set of signatures referred to above. The signature can allow, for example, the page merging circuitry to readily determine whether a page stored or to be stored in the memory is similar to a particular stored page of the record.

The merged page record may also or instead contain a physical memory address for each of the stored pages of the record. The physical memory address can allow, for example, the page merging circuitry to readily map the virtual memory address for a particular page, which is determined to be similar to a particular stored page of the record, to the same physical memory address as the particular stored page of the record.

Generating the metadata for the set of graphics data may accordingly comprise generating and/or maintaining the merged page record for the set of graphics data. The graphics processing system may therefore comprise merged page record circuitry. The merged page record circuitry may form part of the page merging circuitry. The merged page record circuitry may form part of the graphics processing unit (GPU) circuitry and/or part of the central processing unit (CPU) circuitry.

The merged page record may be generated and/or maintained in any desired and suitable way. In some embodiments, the merged page record may be generated and/or maintained once the (e.g. entire) set of graphics data is stored in memory. Alternatively, the merged page record may be generated and/or maintained while copying, transferring and/or writing the set of graphics data to the memory.

As discussed above, providing or generating metadata for a set of graphics data, e.g. that comprises a set or array of signatures and/or merged page record, prior to writing some or all of the set of graphics data to memory has been found to make the page merging process particularly efficient since the page merging circuitry need only consider the metadata, e.g. set or array of signatures and/or merged page record, rather than access and reconsider the set of graphics data itself once the set of graphics data has been generated and/or stored in the memory.

The step of determining whether a page of the set of graphics data stored or to be stored in the memory is similar to a stored page of the set of graphics data stored in the memory may be performed in any desired and suitable way. As will be appreciated, this process may be facilitated by using the metadata described herein.

For example, the step of determining whether a page of the set of graphics data stored or to be stored in the memory is similar to a stored page of the set of graphics data stored in the memory may comprise comparing a signature that is representative of the contents of a page of the set of graphics data stored or to be stored in the memory (as indicated by the metadata, e.g. the set of signatures in the merge buffer, or generated while copying, transferring and/or writing the page to memory) and a signature that is representative of the contents of a stored page of the set of graphics data stored in the memory (as indicated by the metadata, e.g. the merged page record). In these embodiments, when the compared signatures are similar, then the pages may be determined as being similar. Conversely, when the compared signatures are not similar, then those pages may be determined as not being similar. The signatures may take any of the forms and/or may be generated in any of the ways described above.

In some embodiments, determining whether a page of the set of graphics data stored or to be stored in the memory is similar to a stored page of the set of graphics data stored in the memory may comprise comparing the page in question to each, e.g. particular type of, stored page known to be stored in memory (as indicated by the metadata, e.g. the merged page record). Again, this process may be facilitated by using the metadata described herein.

For example, the step of determining whether a page of the set of graphics data stored or to be stored in the memory is similar to a stored page of the set of graphics data stored in the memory may comprise comparing a signature that is representative of the contents of a page of the set of graphics data stored or to be stored in the memory (as indicated by the metadata, e.g. the set of signatures in the merge buffer, or as generated while copying, transferring and/or writing the page to memory) and a signature that is representative of the contents of a stored page of the set of graphics data known to be stored in the memory (as indicated by the metadata, e.g. the merged page record). In these embodiments, when the compared signatures are similar, then the pages may be determined as being similar. Conversely, when the compared signatures are not similar, then those pages may be determined as not being similar. Again, the signatures may take any of the forms and/or may be generated in any of the ways described above.

As will be appreciated, what constitutes "similar" in these embodiments of the technology described herein may be selected as desired. For example, in some embodiments two signatures may be considered as being similar when they are substantially the same and, for example, differ by less than a selected amount. In other embodiments, two signatures may be considered as being similar only when they are the same.

In some embodiments, when a particular page of the set of graphics data is determined as being similar to a particular stored page known to be stored in the memory (as indicated by the metadata, e.g. set of signatures and/or merged page record), the particular page may not be considered to be a newly identified particular type of page of the set of graphics data. In this case, the physical memory address and/or signature for that particular page may not be added to the merged page record. Also, the virtual memory address for the particular page may be mapped to the physical memory address for the particular stored page.

Conversely, when a particular page of the set of graphics data that is stored or to be stored in memory is not determined as being similar to any of the stored pages known to be stored in the memory (as indicated by the metadata, e.g. set of signatures and/or merged page record), the particular page may be considered to be a newly identified particular type of page of the set of graphics data. In this case, the physical memory address and/or signature for that particular page may be added to the merged page record. In this case, the virtual memory address for the particular page may not be mapped to a physical memory address for a particular stored page, and may instead be mapped or remain mapped to a (unique) physical memory address for the particular page.

In some embodiments, the step of determining whether a page of the set of graphics data stored or to be stored in the memory is similar to a stored page of the set of graphics data stored in the memory also or instead comprise determining whether the page stored or to be stored in the memory corresponds to subregions of the set of graphics data that are all similar to one another (e.g. based on the metadata, e.g. signatures, for those subregions).

When a particular page stored or to be stored in the memory is determined as corresponding to subregions of the set of graphics data that are all similar to one another, it may then be determined whether that page is similar to a stored page of the set of graphics data stored in the memory, for example in the manner described above. Conversely, when a particular page stored or to be stored in the memory is determined as corresponding to subregions of the set of graphics data that are not all similar to one another, it may be determined that the particular page is not similar to any of the stored pages of the set of graphics data stored in the memory (even if the particular page in question might, in fact, be similar to a particular stored page).

This approach of determining whether a page of the set of graphics data stored or to be stored in the memory is similar to a stored page of the set of graphics data stored in the memory (only) when that page is determined (e.g. using the metadata) as corresponding to subregions of the set of graphics data that are all similar to one another, despite potentially not merging some pages that might be suitable for merging, has nevertheless been found to be particularly effective and efficient, for example for merging pages of sets of graphics data that have large areas that are the same colour, such as webpages and user interfaces.

In some embodiments, the step of determining whether a page of the set of graphics data stored or to be stored in the memory is similar to a stored page of the set of graphics data stored in the memory may also or instead comprise determining whether the page stored or to be stored in the memory (or each subregion corresponding to that page) is substantially uniform or solid in terms of data (e.g. colour) values (e.g. based on the metadata, e.g. signature or signatures, for that page or its subregions).

When a particular page stored or to be stored in the memory is determined as being substantially uniform or solid in terms of data (e.g. colour) values, it may then be determined whether that page is similar to a stored page of the set of graphics data stored in the memory. Conversely, when a particular page stored or to be stored in the memory is determined as not being substantially uniform or solid in terms of data (e.g. colour) values, it may be determined that the particular page is not similar to any of the stored pages of the set of graphics data stored in the memory (even if the particular page in question might, in fact, be similar to a particular stored page).

This approach of determining whether a page of the set of graphics data stored or to be stored in the memory is similar to a stored page of the set of graphics data stored in the memory (only) when that page is determined (e.g. from the metadata) as being substantially uniform or solid in terms of data (e.g. colour) values, despite potentially not merging some pages that might be suitable for merging, has nevertheless been found to be particularly effective and efficient, for example for merging pages of sets of graphics data that have large areas that are the same colour, such as webpages and user interfaces.

The step of mapping a virtual memory address for the particular page to the same physical memory address as the particular stored page may be performed in any desired and suitable way.

For example, a page stored or to be stored in the memory may have a virtual memory address and may have or may be allocated an initial physical memory address. The initial physical memory address may be allocated by the memory management circuitry of the graphics processing system. The initial physical memory address may be provided in a page table for the set of graphics data that maps virtual memory address for the pages of the set of graphics data to physical memory address for the pages of the set of graphics data.

In these embodiments, when a particular page of the set of graphics data stored or to be stored in the memory is determined as being similar to a particular stored page of the set of graphics data, the step of mapping the virtual memory address for the particular page to the same physical memory address as the particular stored page may comprise remapping the virtual memory address for the particular page from the initial physical memory address for the particular page to the physical memory address of the particular stored page. These embodiments may then comprise releasing the initial physical memory address for the particular page, so that the initial physical memory address may be used to store other data. In this case, embodiments may comprise a step of updating a page table provided for the set of graphics data accordingly.

Conversely when a particular page of the set of graphics data stored or to be stored in the memory is determined as not being similar to a particular stored page of the set of graphics data, the virtual memory address for the particular page may be mapped or may continue to be mapped to the initial physical memory address for that particular page. In this case, embodiments may comprise a step of maintaining a page table provided for the set of graphics data.

As will be appreciated, the step of determining whether a page of the set of graphics data stored or to be stored in a memory of the graphics processing system is similar to a stored page of the set of graphics data stored in the memory may, in practice, be performed respectively for each (every) one of plural pages of the set of graphics data that are stored or to be stored in the memory.

Thus, the step of determining whether a page of the set of graphics data that is stored or to be stored in memory is similar to a stored page of the set of graphics data that is stored in the memory may comprise, for each (every) respective page of the set of graphics data that is stored or to be stored in memory, determining whether that respective page of the set of graphics data that is stored or to be stored in memory is similar to a stored page of the set of graphics data that is stored in the memory.

Similarly, the step of mapping a virtual memory address for a particular page to the same physical memory address as a particular stored page that is determined as being similar to the particular page may, in practice, comprise, for each (every) respective particular page that is determined as being similar to a respective particular stored page of the set of graphics data, mapping that respective particular page to the same physical memory address as that respective particular stored page.

As will also be appreciated, following the page merging process, the virtual memory addresses within the page table may be unique, whereas at least some of the physical memory addresses (e.g. for merged pages) may not be unique.

The set of graphics data that is stored in the memory may subsequently be used in any desired and suitable way. For example, some embodiments may comprise the graphics processing system reading a page of the set of graphics data stored in the memory. In these embodiments, reading the page of the set of graphics data stored in the memory may comprise using a virtual memory address that maps to a physical memory address for the page to be read. Thus, reading the page of the set of graphics data stored in the memory may comprise using a page table for the set of graphics data that maps virtual memory addresses for pages of the set of graphics data to physical memory addresses for pages of the set of graphics data.

In some embodiments, a page of the set of graphics data may be read from the memory responsive to a read request from a graphics processing unit (GPU) circuitry. In other embodiments, a page of the set of graphics data may be read from the memory responsive to a read request from a central processing unit (CPU) circuitry of the graphics processing system. In yet other embodiments, a page of the set of graphics data may be read from the memory responsive to a read request from output, e.g. display, processing circuitry of the graphics processing system.

The page of the set of graphics data may be read from the memory using memory management unit (MMU) circuitry and/or a cache of the graphics processing system. As discussed above, the graphics processing system may comprise a memory management unit (MMU) circuitry and/or a cache for use by the graphics processing unit (GPU) circuitry and/or a memory management unit (MMU) circuitry and/or a cache for use by the central processing unit (CPU) circuitry. The graphics processing system may also comprise a memory management unit (MMU) circuitry and/or a cache for use by output, e.g. display, processing circuitry of the graphics processing system.

Some embodiments may comprise performing further graphics processing, e.g. a texture look up, compositing, etc., using a page of the set of graphics data read from the memory. Other embodiments may comprise outputting a page of the set of graphics data read from the memory, e.g. for display.

As will be appreciated, the step of reading a page of the set of graphics data stored in the memory may be performed in respect of each (every) one of plural pages of the set of graphics data stored in the memory.

As will also be appreciated, the processes described herein that are performed in respect of the set of graphics data may be perform in respect of each one of plural sets of graphics data, e.g. that together provide a (e.g. composited) desired graphics output (e.g. frame for display).

Embodiments of the technology described herein may comprise generating tiles (subregions) of the set of graphics data, such as an image or texture. The tiles may be generated by graphics processing unit (GPU) circuitry of the graphics processing system. The tiles may be stored in a frame buffer of the memory of the graphics processing system. Metadata for each tile may be generated whilst generating the set of graphics data. The metadata may be generated by the graphics processing unit (GPU) circuitry of the graphics processing system. The metadata may comprise a colour value for each tile. For example, when a tile is of a solid colour, the colour value for that tile may be that solid colour value. When a tile is not of a solid colour, the colour value for that tile may be set to a reserved colour value. The colour values for the tiles may be stored in a merge buffer of the memory. Additional metadata may be generated during a page merging process that is performed on the pages corresponding to the tiles stored in the memory. The additional metadata may comprise a merged page record that comprises a colour value and physical memory address for pages in the memory that have been determined as being of a solid colour. The metadata in the merge buffer may be used to determine whether a page that is stored in the memory is of a solid colour. If a page is of a solid colour, then the metadata in the merged page record may be used to determine whether that page is the same colour as a stored page that has already been determined as being of a solid colour. When a particular page is determined as being the same colour as a particular stored page, the virtual memory address for the particular page may be mapped to the same physical memory address as the particular stored page. The pages of the set of graphics data may later be read from the memory, e.g. for further processing by the graphics processing unit (GPU) circuitry or for display.

Similarly, other embodiments of the technology described herein may comprise copying, transferring and/or writing pages (subregions) of the set of graphics data, such as an image or texture, to the memory of the graphics processing system. The pages may be copied, transferred and/or written to the memory by central processing unit (CPU) circuitry of the graphics processing system. Metadata for the pages of the set of graphics data may be generated whilst copying, transferring and/or writing those pages to the memory. The metadata may comprise a merged page record that comprises a colour value and physical memory address for pages already copied, transferred and/or written to the memory that have been determined as being of a solid colour. If a subsequent page to be copied, transferred and/or written to the memory is of a solid colour, then the metadata in the merged page record may be used to determine whether that page is the same colour as a stored page that has already been copied, transferred and/or written to the memory. When a particular page to be copied, transferred and/or written to the memory is determined as being the same colour as a particular stored page that has already been copied, transferred and/or written to the memory, the virtual memory address for the particular page may be mapped to the same physical memory address as the particular stored page. The pages of the set of graphics data may later be read from the memory, e.g. for processing by graphics processing unit (GPU) circuitry of the graphics processing system.

The technology described herein can be used for all forms of output that a graphics processing system may be used to generate, such as frames for display, render to texture outputs, etc.

In an embodiment, the various functions of the technology described herein are carried out on a single graphics processing platform that generates and/or uses the set of graphics data.

In some embodiments, the graphics processing system comprises, and/or is in communication with, one or more memories and/or memory devices that store the data described herein, and/or store software for performing the processes described herein. The graphics processing system may be in communication with a display for displaying images based on the set of graphics data.

The technology described herein can be implemented in any suitable system, such as a suitably configured computer or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

Thus, the page merging circuitry, signature generating circuitry, merged page record circuitry and/or output processing circuitry may be implemented as desired, e.g. in the form of fixed-function processing circuitry (hardware) (i.e. that is dedicated to one or more functions that cannot be changed), or as programmable processing circuitry that can be and is programmed to perform the desired operation, or as a combination of fixed-function processing circuitry and programmable processing circuitry.

It should also be noted here that, as will be appreciated by those skilled in the art, the various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the graphics processing system can otherwise include any one or more or all of the usual functional units, etc., that graphics processing systems include.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein relate to a page merging process that can reduce the amount of memory needed to store a set of graphics data. The page merging process may be facilitated by using metadata provided for the set of graphics data. Various embodiments of the technology described herein will now be described in the context of the processing of graphics data for display.

FIG. 1 shows a graphics processing system 100 according to embodiments of the technology described herein. The graphics processing system 100 comprises a graphics processing unit (GPU) 102 and central processing unit (CPU) 110. As is shown in FIG. 1, the GPU 102 and CPU 110 communicate with a shared main memory 108 of the graphics processing system 100 using respective memory management units (MMUs) 104, 112 via respective caches 106, 114.

In some embodiments, the GPU 102 generates a set of graphics data and stores that set of graphics data in the memory 108. In some embodiments, the CPU 110 may also or instead upload or generate a set of graphics data and store that set of graphics data in the memory 108. Pages of the set of graphics data may then be output, e.g. for display. Alternatively, the GPU 102 may access pages of the set of graphics data that are stored in the memory 108 and perform further graphics processing operations, e.g. compositing, using that graphics data. The GPU 102 may then store the resultant, e.g. composited, set of graphics data in the memory 108. Again, the set of graphics data may be output, e.g. for display.

When the GPU 102 or CPU 110 stores the set of graphics data in the memory 108, the relevant MMU 104, 112 may assign a physical memory address to each page of the set of graphics data to be stored in the memory 108. In doing this, the MMU 104, 112 may provide a page table that maps virtual memory addresses for the pages of graphics data to the corresponding physical memory addresses in the memory 108. In order to access a page of the set of graphics data stored in the memory 108, the GPU 102 or CPU 110 can then make a memory access request using the virtual memory address for the page of graphics data. The relevant MMU 104, 112 can then determine the corresponding physical memory address for the page of graphics data using the page table and fetch the page of graphics data into the relevant cache 106, 114 for the GPU 102 or CPU 110 to read.

Figure 2:
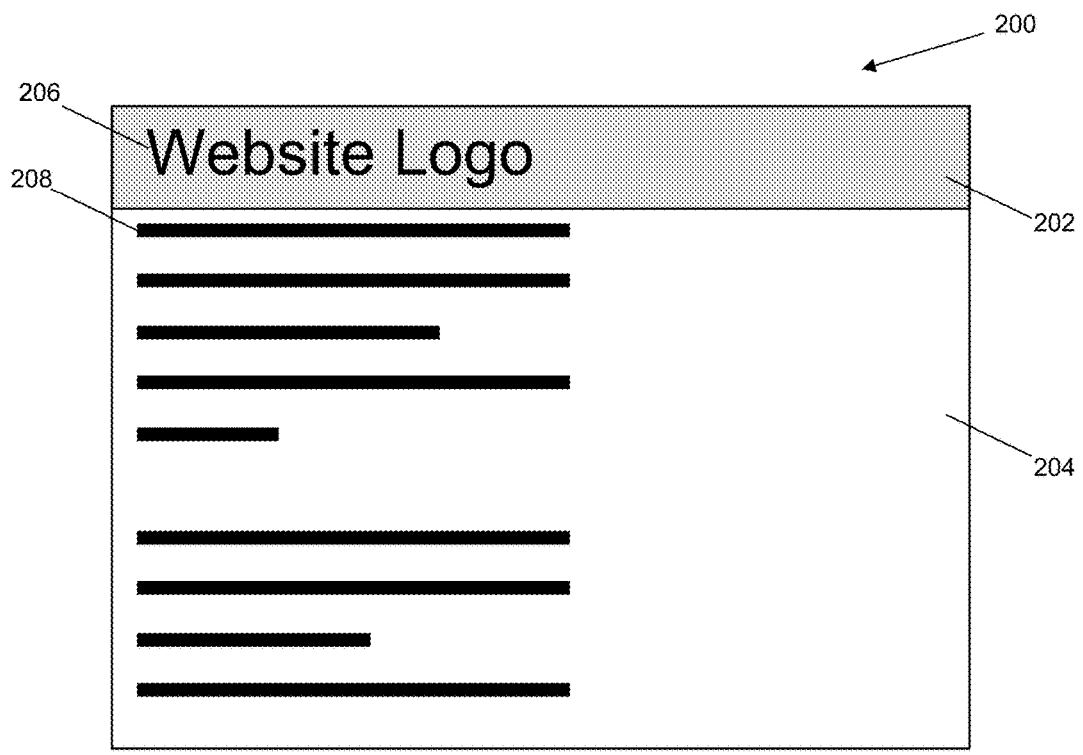
FIG. 2 shows a webpage that can be processed in accordance with embodiments of the technology described herein.

FIG. 2 shows a webpage 200 that may be generated or uploaded and then stored in the memory 108 of the graphics processing system 100 of FIG. 1. The webpage 200 comprises a banner 202 of a solid grey colour, a background 204 of a solid white colour, a website logo 206 and several lines of text 208. The set of graphics data (i.e. set of pixel data) for this webpage 200 will be referred to in the following embodiments. However, it will be appreciated that the webpage 200 provides just one simple example of a set of graphics data that may be processed in accordance with embodiments of the technology described herein and that other, e.g. more complicated, sets of graphics data may be processed in a similar manner.

Figure 3:
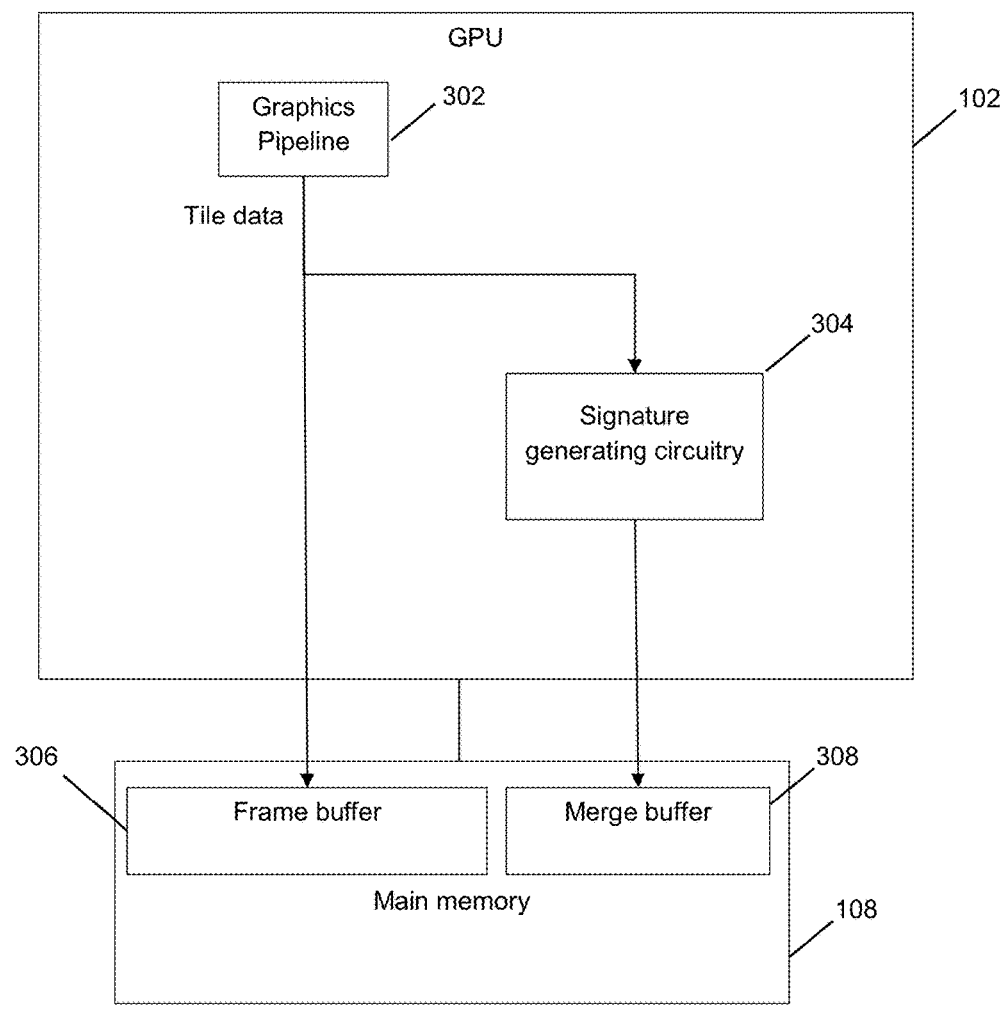
FIG. 3 shows graphics processing unit circuitry and a main memory of a graphics processing system in accordance with embodiments of the technology described herein.

FIG. 3 shows further details of the GPU 102 and memory 108 of the graphics processing system 100 of FIG. 1. The CPU 110, MMUs 104, 112 and caches 106, 114 have been omitted from FIG. 3 for clarity.

In this embodiment, the GPU 102 comprises a graphics processing pipeline 302 that generates the set of graphics data for the webpage 200 and stores that set of graphics data in a frame buffer 306 in the memory 108. In this embodiment, the GPU 102 generates, in series, subregions or "tiles" of the set of graphics data. In this embodiment, each tile comprises 64×64 sampling positions. As will be appreciated, other tile sizes may be used as desired. The tiles of graphics data may be stored in a tile buffer (not shown) of the GPU 102 prior to being stored in memory 108.

Figure 4:
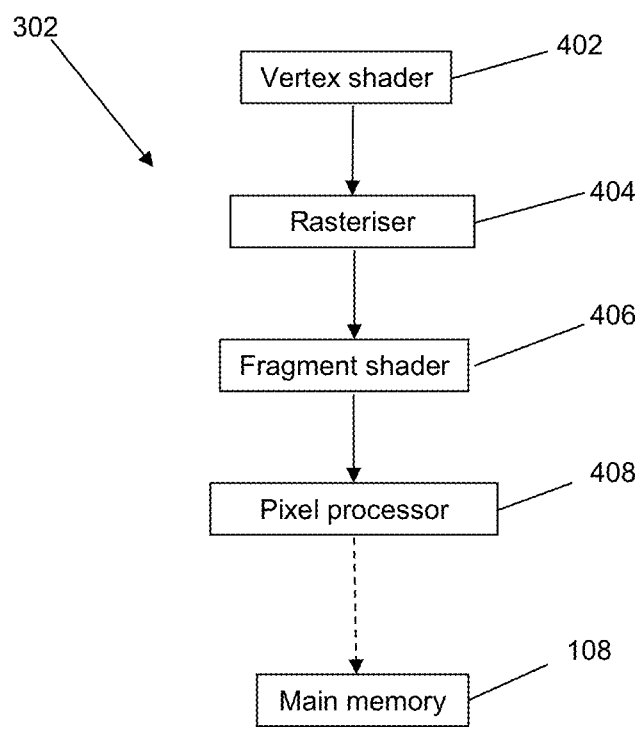
FIG. 4 shows a graphics processing pipeline that can be used in embodiments of the technology described herein.

The graphics processing pipeline 302 and rendering process will now be described in more detail with reference to FIG. 4, which illustrates the various stages of the graphics processing pipeline 302 together with the memory 108 of the graphics processing system. The pipeline 302 comprises a sequence of different stages, which each perform a different operation on "primitives" (e.g. polygons) making up the surfaces of the features of the webpage to prepare them for output.

First in the pipeline 302 is a vertex shader 402 which vertex shades the vertices of the primitives for the output being generated. The vertex shader 402 takes the input data values associated with the vertices, etc., defined for the output to be generated, and processes those data values to generate a set of corresponding vertex shaded attribute data values for use by subsequent stages of the graphics processing pipeline 302.

The rasteriser 404 then operates to rasterise the primitives making up the render output into individual graphics fragments for processing. To do this, the rasteriser 404 receives the graphics primitives for rendering, rasterises the primitives to sampling points and generates graphics fragments representing appropriate sampling positions for rendering the primitives. The fragments generated by the rasteriser 404 are then sent onwards to the rest of the pipeline 302 for processing.

The graphics fragments generated by the rasteriser 404 are then passed to the fragment shader 406 for shading. The output of the fragment shader 406 is a set of appropriately shaded, e.g. colour, values for sampling positions for the output in question.

The shaded sampling positions from the fragment shader 406 are then processed by a pixel processor 408 to post-process, e.g. down-sample, the rendered sampling positions to provide the sampling position data (pixel data) for the pixels that will actually be output. The pixel data may then be output to memory 108.

Other arrangements for the graphics processing pipeline 302 would, of course, be possible.

Referring again to FIG. 3, the GPU 102 also comprises signature generating circuitry 304. The signature generating circuitry 304 generates a signature for each tile of the set of graphics data that is representative of the contents of that tile. An array of the signatures for the tiles is stored in a merge buffer 308 of the memory 108. The array of signatures in the merge buffer 308 forms part of the metadata for the set of graphics data that may be used in a later page merging process. An embodiment of a page merging process that makes use of this array of signatures is described in more detail below.

The process 500 of generating the tiles of the set of graphics data and the signatures for the tiles will now be described with reference to FIG. 5. The process starts at step 502. At step 504, the graphics processing unit circuitry determines whether there are any more tiles of the set of graphics data left to generate. When there are more tiles to generate, the next tile is generated at step 506. Then, in steps 508, 510, 512 and 514, the signature (in this embodiment a colour value) for that tile is determined and stored in the merge buffer 308.

In this embodiment, the colour value is determined firstly by checking whether the tile is of a solid colour at step 508. Step 508 may comprise comparing a colour value of each subsequent sampling position of the tile to a colour value of a previous sampling position of the tile. This process may continue either until all of the sampling positions of the tile have been considered without finding a colour value of a subsequent sampling position of the tile that is dissimilar to a colour value of a previous sampling position of the tile, in which case the tile may be considered to be of a solid colour, or until a colour value of a subsequent sampling position of the tile is found that is not the same as a colour value of a previous sampling position of the tile, in which case the tile may be considered as not being of a solid colour.

If it is then determined at step 510 that the tile in question is of a solid colour, then the signature for that tile is that solid colour value. The solid colour value is accordingly written to the merge buffer 308 at step 512. Conversely, if it is determined at step 510 that the tile in question is not of a solid colour, then the signature for that tile is set to a reserved colour value to indicate that the tile is not of a solid colour. The reserved colour value is then accordingly written to the merge buffer 308 at step 514.

Next, at step 516, the tile is written to the frame buffer. The process then returns to step 504 to consider whether there are any more tiles to generate. When there are no more tiles to generate, the process of generating the tiles and signatures finishes at step 518.

Figure 5:
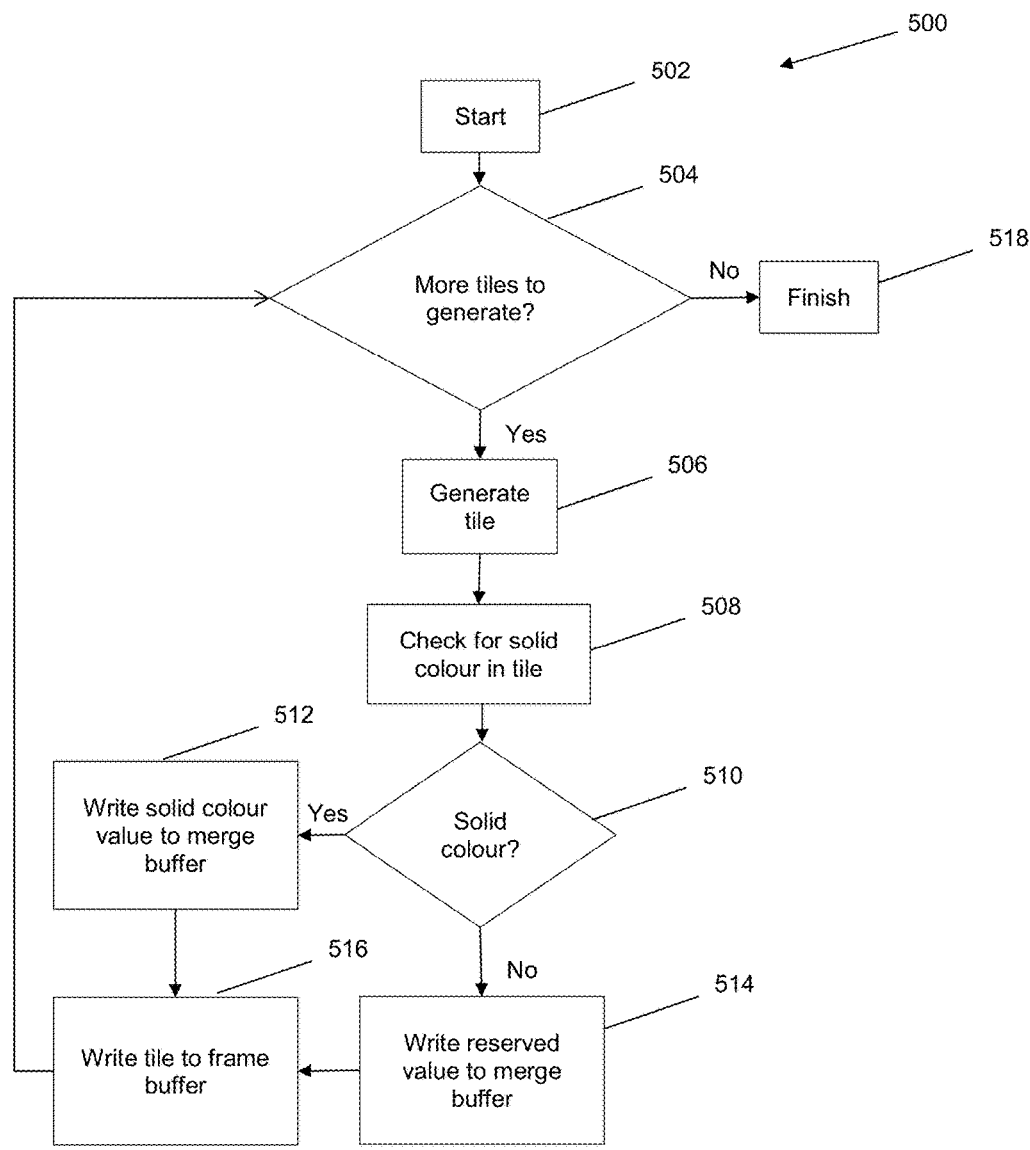
FIG. 5 shows a method of generating metadata whilst generating tiles of a set of graphics data in accordance with embodiments of the technology described herein.

As will be appreciated, the result of the process 500 of FIG. 5 is a set of graphics data stored in the frame buffer 306 and a corresponding array of signatures (metadata) for the set of graphics data stored in the merge buffer 308.

Figure 6:
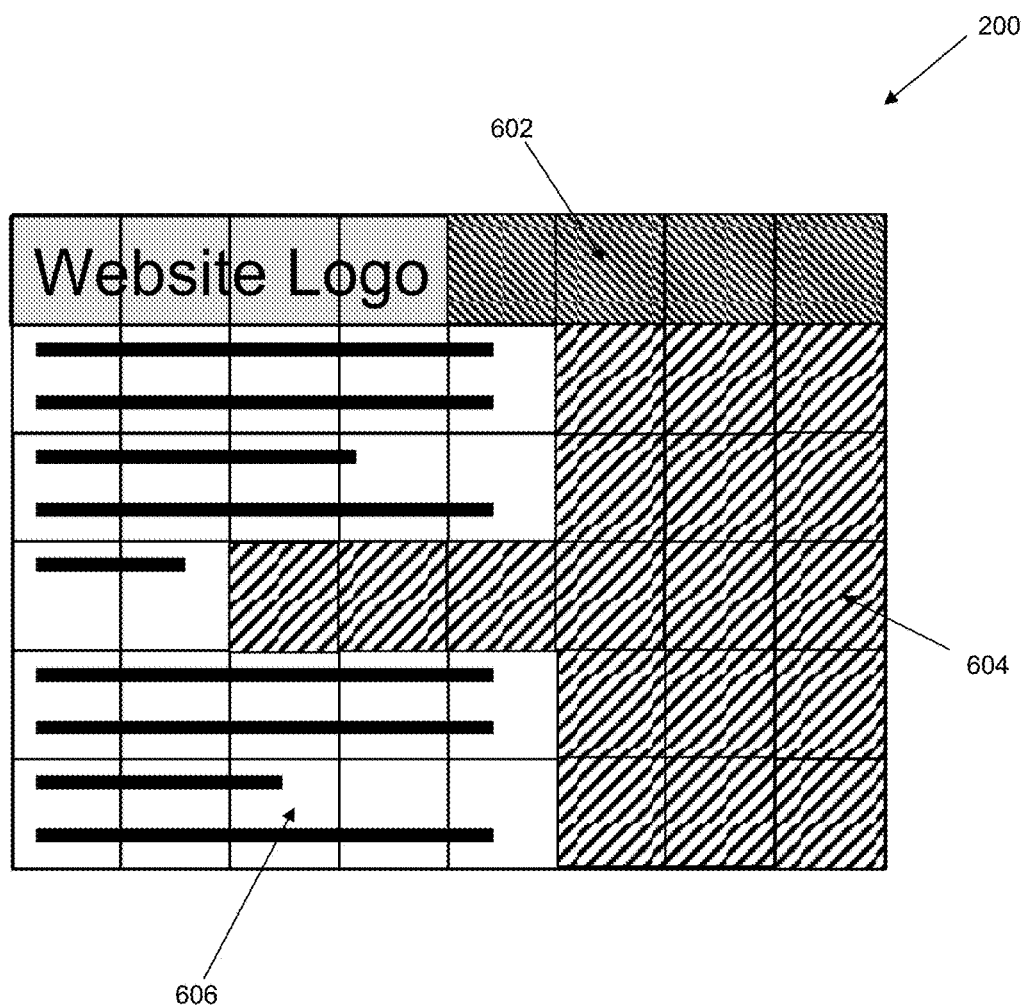
FIG. 6 shows the webpage of FIG. 2 divided into tiles of graphics data.

FIG. 6 shows the webpage 200 of FIG. 2 when divided into tiles for processing in the manner of FIG. 5. In this embodiment, the webpage is divided into 8×6 equal tiles. As will be appreciated, other numbers of tiles may be used as desired.

In this embodiment, as is shown in FIG. 6 with different shading, there is a first set of four tiles 602 that are determined as being of a first solid grey colour (i.e. the colour of the banner 202 for the webpage), a second set of eighteen tiles 604 that are determined as being of a second solid white colour (i.e. the colour of the background 204 for the webpage 200), and a third set of tiles 606 that are determined as not being of a solid colour (i.e. they contain either the website logo 206 or the text 208 for the webpage 200).

Figure 7:
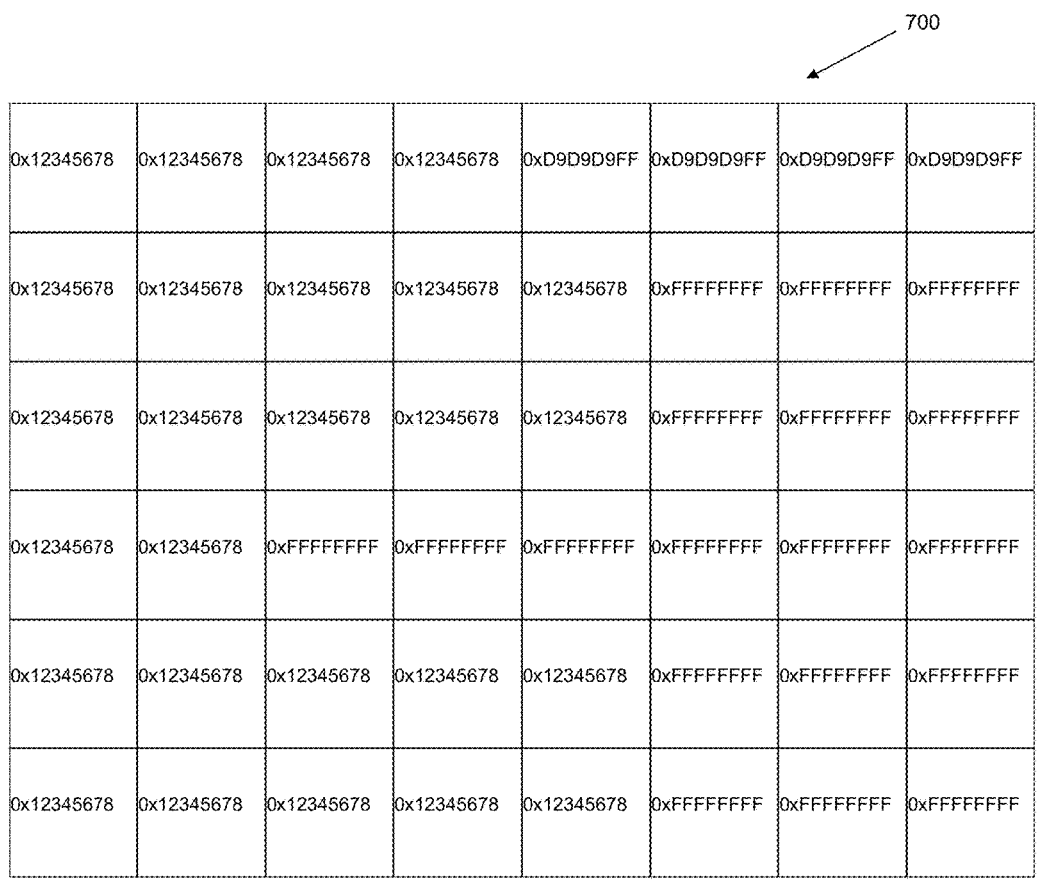
FIG. 7 shows the contents of a merge buffer for the tiles of FIG. 6.

FIG. 7 shows the metadata (set of signatures) 700 stored in the merge buffer 308 for the set of graphics data for the webpage 200 of FIG. 2. The values shown are the respective colour values corresponding to the tiles for the webpage 200 of FIG. 6. In this embodiment, as is shown in FIG. 7, there is a first solid colour value 0xD9D9D9FF (opaque grey) stored as the signature for each tile of the first set of four tiles 602, a second solid colour value 0xFFFFFFFF (opaque white) stored as the signature for each tile of the second set of eighteen tiles 604, and a third reserved colour value 0x12345678 (semi-transparent dark blue) stored as the signature for each tile of the third set of tiles 606. As will be appreciated, a different reserved colour value may be used as desired.

A first embodiment of a page merging process will now be described with reference to FIGS. 8-10. As will be described in more detail below, this embodiment makes use of metadata in the form of an array of signatures generated in advance and stored in a merge buffer 308 as described above.

Figure 8:
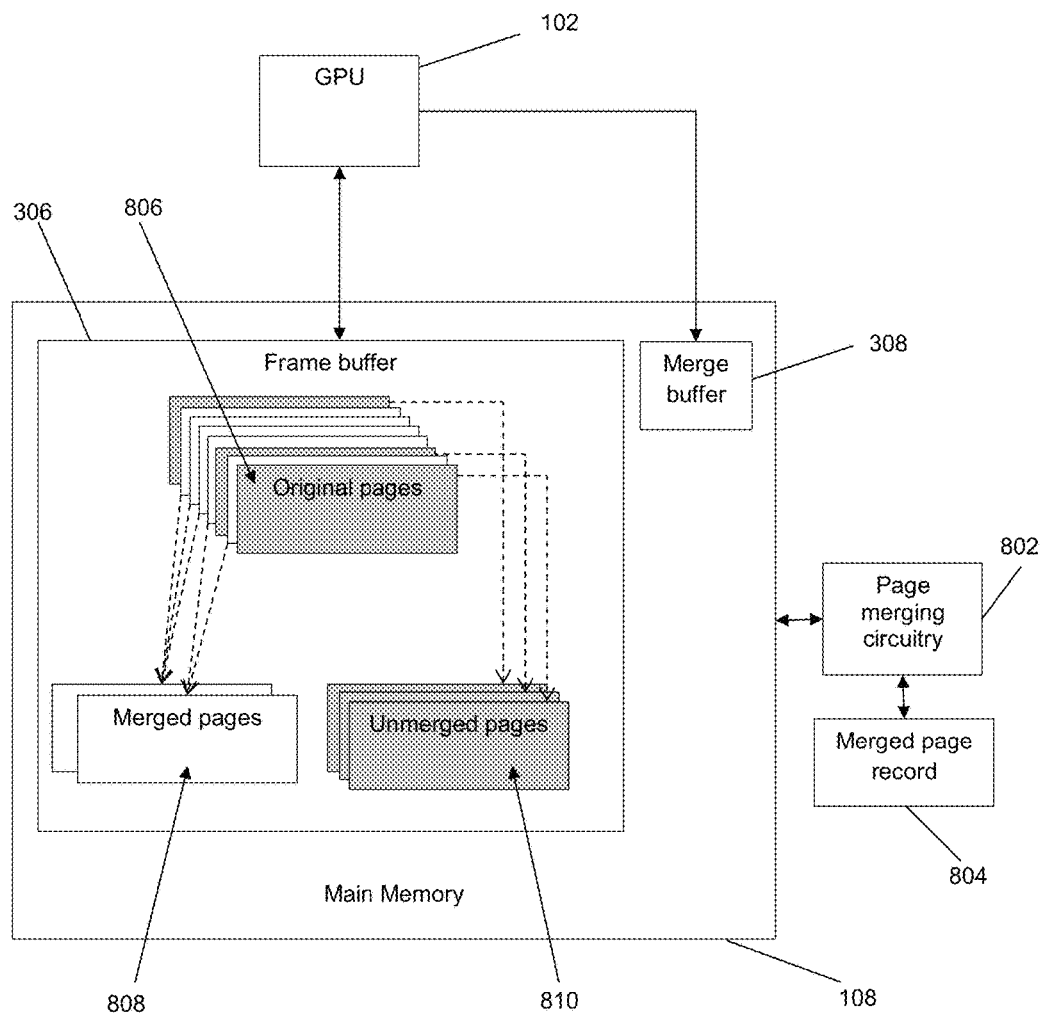
FIG. 8 shows graphics processing unit circuitry, a main memory and page merging circuitry of a graphics processing system in accordance with embodiments of the technology described herein.

FIG. 8 shows further details of the GPU 102 and memory 108 of the graphics processing system 100 of FIG. 1. The CPU 110, MMUs 104, 112 and caches 106, 114 have again been omitted from FIG. 8 for clarity. FIG. 8 also shows page merging circuitry 802 that performs the page merging process. The page merging circuitry 802 may form part of an MMU 104, 112, part of the CPU 110, or may be a separate set of circuitry.

As will be described in more detail below, the page merging circuitry 802 is able to access the merge buffer 308 in the memory 108. This embodiment accordingly makes use of the metadata (array of signatures) stored in the merge buffer 308. As will also be described in more detail below, the page merging circuitry 802 generates and maintains further metadata for the set of graphics data in the form of a merged page record 804. In this embodiment, the merged page record 804 relates to pages of a particular type (in this embodiment having a particular solid colour) known to be stored in the frame buffer 306. In this embodiment, the merged page record 804 comprises a signature (i.e. the solid colour value) and physical memory address for each page in the merged page record 804.

FIG. 8 also illustrates how the virtual memory addresses for the pages of the set of graphics data stored in the frame buffer 306 are remapped as a result of the page merging process. As is shown in FIG. 8, the physical memory addresses corresponding to the virtual memory addresses for the original pages 806 of the set of graphics data are reduced in number to a set of physical memory addresses for merged pages 808 together with a set of physical memory addresses for the remaining unmerged pages 810. It should be noted here that the dashed lines in FIG. 8 are intended to indicate the remapping of virtual memory addresses to new physical memory addresses, rather than to indicate that the pages themselves are transferred to new physical locations within the memory 108.

The reduced set of physical memory addresses for the pages of the set of graphics data stored in the frame buffer 306 may, at a subsequent time, be read either by the GPU 102 or by the CPU 110 for further processing, e.g. compositing. Alternatively, the pages of the set of graphics data stored in the frame buffer 306 may, at a subsequent time, be read by output, e.g. display, processing circuitry (not shown) for outputting, e.g. to a display (also not shown).

A process 900 of merging pages of the set of graphics data will now be described with reference to FIG. 9. The process starts at step 902. At step 904, the page merging circuitry 802 determines whether there are any more pages of the set of graphics data left to consider in the frame buffer 306. When there are more pages to consider, then at step 906, the page merging circuitry 802 inspects the merge buffer 308 for tile colour values that correspond to the page under consideration. The correspondence between the page and its tiles may be defined by a dependence that is provided to, or determined by, the page merging circuitry 802.

If it is determined at step 908 that the colour values for the corresponding tiles are not the same, then the page is considered not to be of a solid colour. In this case, the page merging process returns to step 904 to consider any further pages in the frame buffer 306. Conversely, if it is determined at step 908 that the colour values for the corresponding tiles are the same, then the page may be considered to be of a solid colour, and so the page merging process moves on to step 910.

If it is determined at step 910 that the signatures for the corresponding tiles represent non-solid colouring, i.e. the colour value for each tile is a reserved colour value, then the page is considered not to be of a solid colour. In this case, the page merging process returns to step 904 to consider any further pages in the frame buffer 306. Conversely, if it is determined at step 910 that the colour value for the corresponding tiles represent a solid colour value, then the page is considered to be of a solid colour, and so the page merging process moves on to step 912.

At step 912, the page merging circuitry 802 inspects the merged page record 804 for the colour value for the tiles of the page. If the colour value is not found at step 914, then the page is considered to be a newly identified particular type (i.e. solid colour) of stored page stored in the frame buffer 306. In this case, the page merging process moves on to step 916, in which the page merging circuitry 802 adds the colour and physical memory address for the newly identified particular type of stored page to the merged page record 804 for future use. The page merging process then returns to step 904 to consider any further pages in the frame buffer 306.

Conversely, if the colour value is found at step 914, then the page is considered to be the same as another coloured page previously identified as being stored in the frame buffer 306. In this case, the page merging process moves on to step 918, in which the page merging circuitry 802 maps the virtual memory address for the page under consideration to the physical memory address for the solid coloured page previously identified as being stored in the frame buffer 306. Then, at step 920, the physical memory address for the page under consideration is released such that it may be used to store other pages of data.

The page merging process then returns to step 904 to consider the next page in the frame buffer 306. When there are no more pages left to consider, the process of merging pages finishes at step 922.

Figure 9:
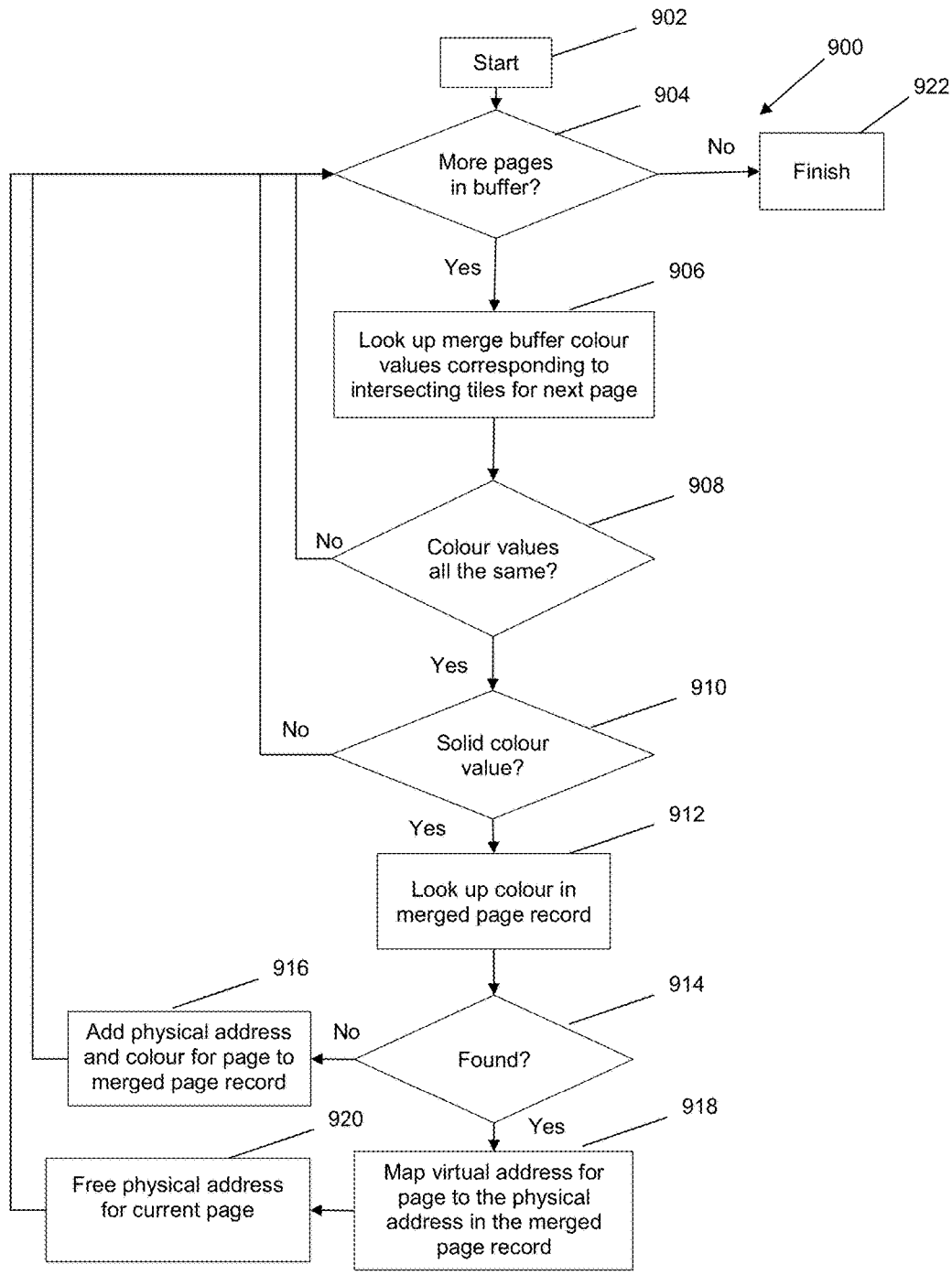
FIG. 9 shows a method of generating further metadata and merging pages of a set of graphics data in accordance with embodiments of the technology described herein.

As will be appreciated, the result of the process 900 of FIG. 9 is that the virtual memory addresses for pages of the set of graphics data that are determined as being similar to each other are mapped to the same physical memory address in memory 108.

Figure 10:
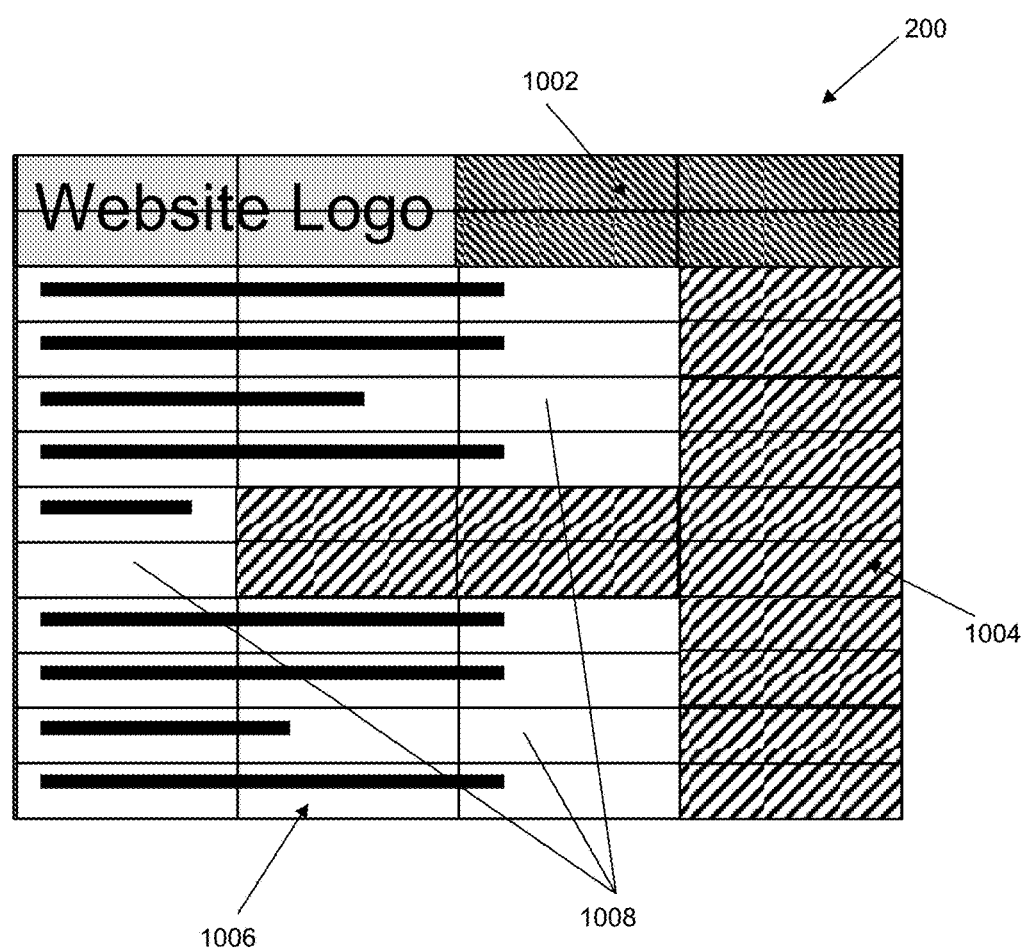
FIG. 10 shows the webpage of FIG. 2 divided into pages of graphics data in accordance with embodiments of the technology described herein.

FIG. 10 shows the webpage 200 of FIG. 2 when divided into the pages of the set of graphics data that are stored in the memory 108. In this embodiment, the webpage is divided into 12×4 pages, with each page comprising either the upper halves or lower halves of two side-by-side tiles (cf. FIG. 6). As will be appreciated, other page shapes and/or sizes may be used as desired.

In this embodiment, as is shown in FIG. 10 with different shading, there is a first set of four merged pages 1002 that are determined as being of a solid grey colour (i.e. the colour of the banner 202 of the webpage 200) and which accordingly have virtual memory address mapped to the same physical memory address in the memory 108, a second set of fourteen merged pages 1004 that are determined as being of a solid white colour (i.e. the colour of the background 204 of the webpage 200) and which accordingly have virtual memory address mapped to the same physical memory address in the memory 108, and a third set of unmerged pages 1006 that are determined as not being of a solid colour and which therefore have virtual memory address mapped to respective unique physical memory addresses in the memory 108.

It is to be noted here that the majority of the third set of unmerged pages 1006 are correctly determined as not being of a solid colour, since those pages contain either a logo or text on a contrasting banner or background. However, the third set of unmerged pages 1006 also comprises three pages 1008 that have been incorrectly determined as not being of a solid colour. This is due to the fact that those three pages 1008 each correspond to tiles having different colour values or to tiles that were determined as not being solid in colour (cf. FIG. 6) and so those three pages 1008 were not considered beyond step 908 or step 910 of FIG. 9. Despite sometimes not merging some pages that can be merged, these embodiments of the technology described herein are still considered to be advantageous since the page merging process is facilitated by the GPU 102 generating the signatures for the tiles (rather than for the pages) of the set of graphics data in advance, rather than the page merging circuitry having to access and reconsider the pages of the set of graphics data once they has been stored in the memory 108.

In other embodiments, the signature may comprise something other than a colour value or reserved colour value, such as a checksum, a CRC, or a hash value, etc., derived from or generated for the data for the tile in question. In these alternative embodiments, steps 508, 510, 512 and 514 in FIG. 5 may be replaced with a step of generating the signature for the tile and then a step of writing that signature to the merge buffer 308. Similarly, step 910 in FIG. 9 may be omitted and steps 906, 908, 912 and 916 may refer to a signature rather than a colour value.

A second embodiment of a page merging process will now be described with reference to FIGS. 11-13. As will be described in more detail below, this second embodiment makes use of metadata generated whilst writing the set of graphics data to the frame buffer 306 in memory 108, rather than metadata generated whilst generating the set of graphics data.

Figure 11:
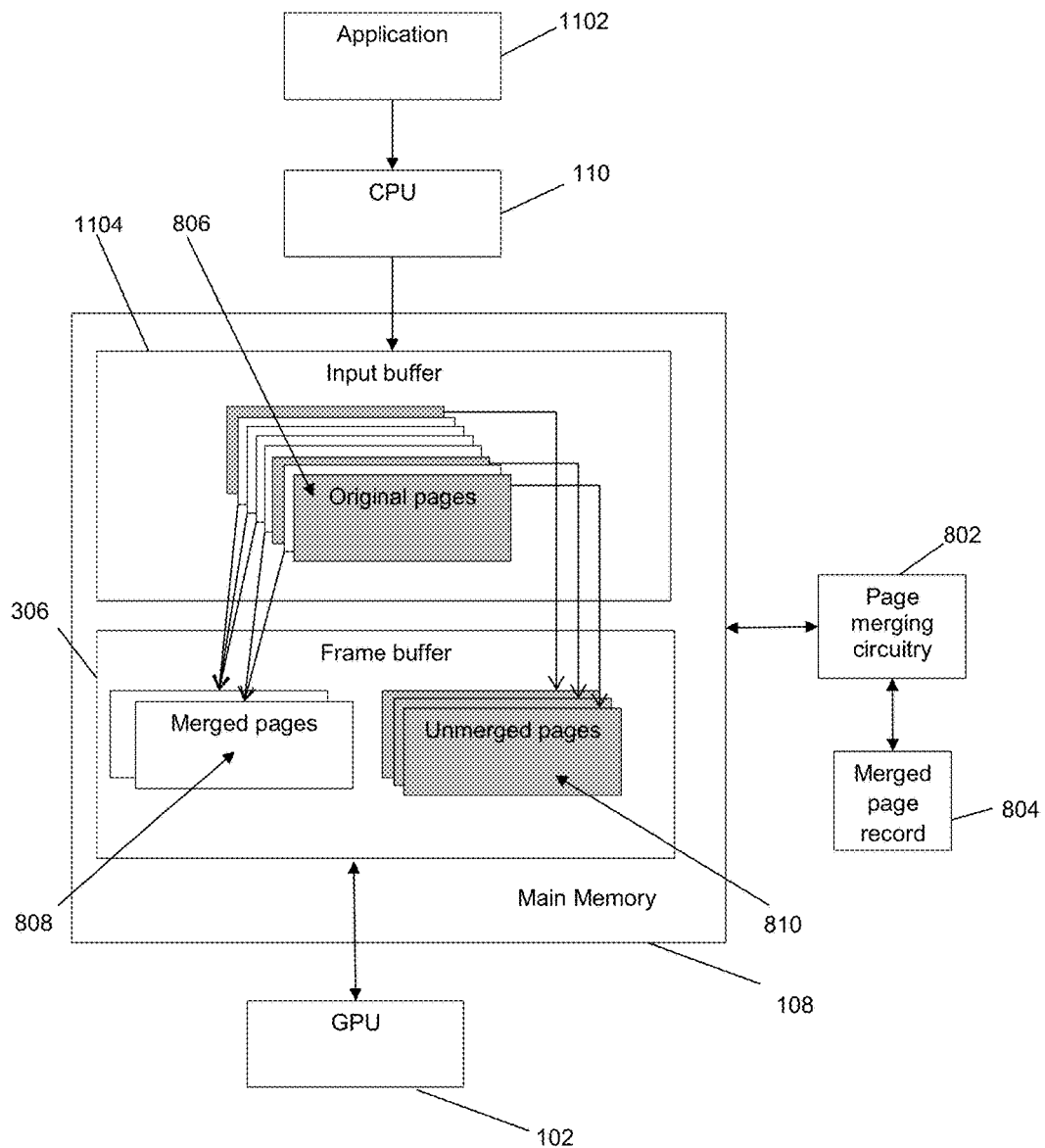
FIG. 11 shows central processing unit circuitry, a main memory, page merging circuitry and graphics processing unit circuitry of a graphics processing system in accordance with further embodiments of the technology described herein.

FIG. 11 shows further details of the CPU 110 and memory 108 of the graphics processing system 100 of FIG. 1. The MMUs 104, 112 and caches 106, 114 have been omitted from FIG. 11 for clarity. In this embodiment, the CPU 110, under the control of an application 1102, generates a set of graphics data and stores that set of graphics data in an input buffer 1104 of the memory 108.

FIG. 11 also shows the page merging circuitry 802 that performs the page merging process. As will be described in more detail below, the page merging circuitry 802 is able to access linear pages of the set of graphics data stored in the input buffer 1104, convert those linear pages of graphics data to block pages of the set of graphics data, and then write those block pages of the set of graphics data to the frame buffer 306 of the memory 108. As will also be described in more detail below, the page merging circuitry 802 generates and maintains metadata for the set of graphics data in the form of a merged page record 804. In this embodiment, the merged page record 804 again relates to pages of a particular type (i.e. having a particular solid colour) known to be stored in the frame buffer 306. In this embodiment, the merged page record 804 again comprises a signature (i.e. the solid colour value) and physical memory address for each page in the merged page record 804.

FIG. 11 also illustrates how the virtual memory addresses for the pages of the set of graphics data stored in the frame buffer 306 are mapped as a result of the page merging process. As is shown in FIG. 11, the physical memory addresses in the input buffer 1104 corresponding to the virtual memory addresses for the original pages 806 of the set of graphics data are reduced in number to a set of physical memory addresses in the frame buffer 306 for merged pages 808 together with a set of physical memory addresses in the frame buffer 306 for the remaining unmerged pages 810. It should noted here that the solid lines in FIG. 11 are intended to indicate the physical transfer or copying of the set of graphics data from the input buffer 1104 to the frame buffer 306.

The reduced set of physical memory addresses for the pages of the set of graphics data stored in the frame buffer 306 may, at a subsequent time, be read either by the GPU 102 or by the CPU 110 for further processing, e.g. compositing. Alternatively, the pages of the set of graphics data stored in the frame buffer 306 may, at a subsequent time, be read by output, e.g. display, processing circuitry (not shown) for outputting, e.g. to a display (also not shown).

A process 1200 of merging pages of the set of graphics data will now be described with reference to FIG. 12. The process starts at step 1202. At step 1204, the page merging circuitry 802 determines whether there are more pages of the set of graphics data in the input buffer 1404 left to copy to the frame buffer 306.

When there are more pages to copy, at step 1206 the page merging circuitry 802 allocates a physical memory address in the frame buffer 306 for that page. Then, at step 1208, the page merging circuitry 802 copies the page across to the allocated physical memory address in the frame buffer 306. As part of this step, the page merging circuitry 802 may convert the page from a linear format to a block format. As a further part of this step, the page merging circuitry 802 generates a signature (i.e. colour value) for the page. Step 1208 may accordingly comprise comparing a colour value of each subsequent data position of the page to a colour value of a previous data position of the page. This process may continue either until all of the data positions of the page have been considered without finding a colour value of a subsequent data position of the page that is dissimilar to a colour value of a previous data position of the page, in which case the page may be considered to be of a solid colour, or until a colour value of a subsequent data position of the page is found that is not the same as a colour value of a previous data position of the page, in which case the page may be considered as not being of a solid colour.

If, at step 1210, it is determined from the signature for the page that the page is not of a solid colour then, at step 1212, the page merging circuitry 802 maps the virtual memory address for the page to the allocated physical memory address for the page. The page merging process then returns to step 1204 to consider any further pages in the input buffer 1404. Conversely, if it is determined at step 1210 that the page is of a solid colour then the page merging process moves on to step 1214, in which the page merging circuitry 802 inspects the merged page record 804 for the colour value for the page.

If the colour value is not found at step 1216, then the page is considered to be a newly identified particular type (i.e. solid colour) of page to be stored in the frame buffer 306. In this case, the page merging process moves on to step 1218, in which the page merging circuitry 802 adds the colour value and physical memory address for the newly identified particular type of stored page to the merged page record 804 for future use. The page merging circuitry 802 then moves to step 1212, in which the virtual memory address for the page is mapped to the allocated physical memory address for the page. The page merging process then returns to step 1204 to consider any further pages in the input buffer 1404.

Conversely, if the colour value is found at step 1216, then the page is considered to be the same as another solid coloured page previously identified as being stored in the frame buffer 306. In this case, the page merging process moves on to step 1220, in which the page merging circuitry 802 maps the virtual page for the page under consideration to the physical memory address for the solid coloured page previously identified as being stored in the frame buffer 306. Then, at step 1222, the physical memory address initially allocated for the page under consideration is released and may therefore be used to store other pages of data.

The page merging process then returns to step 1204 to consider any further pages in the input buffer 1404. When there are no more pages to consider, the process of merging pages finishes at step 1224.

Figure 12:
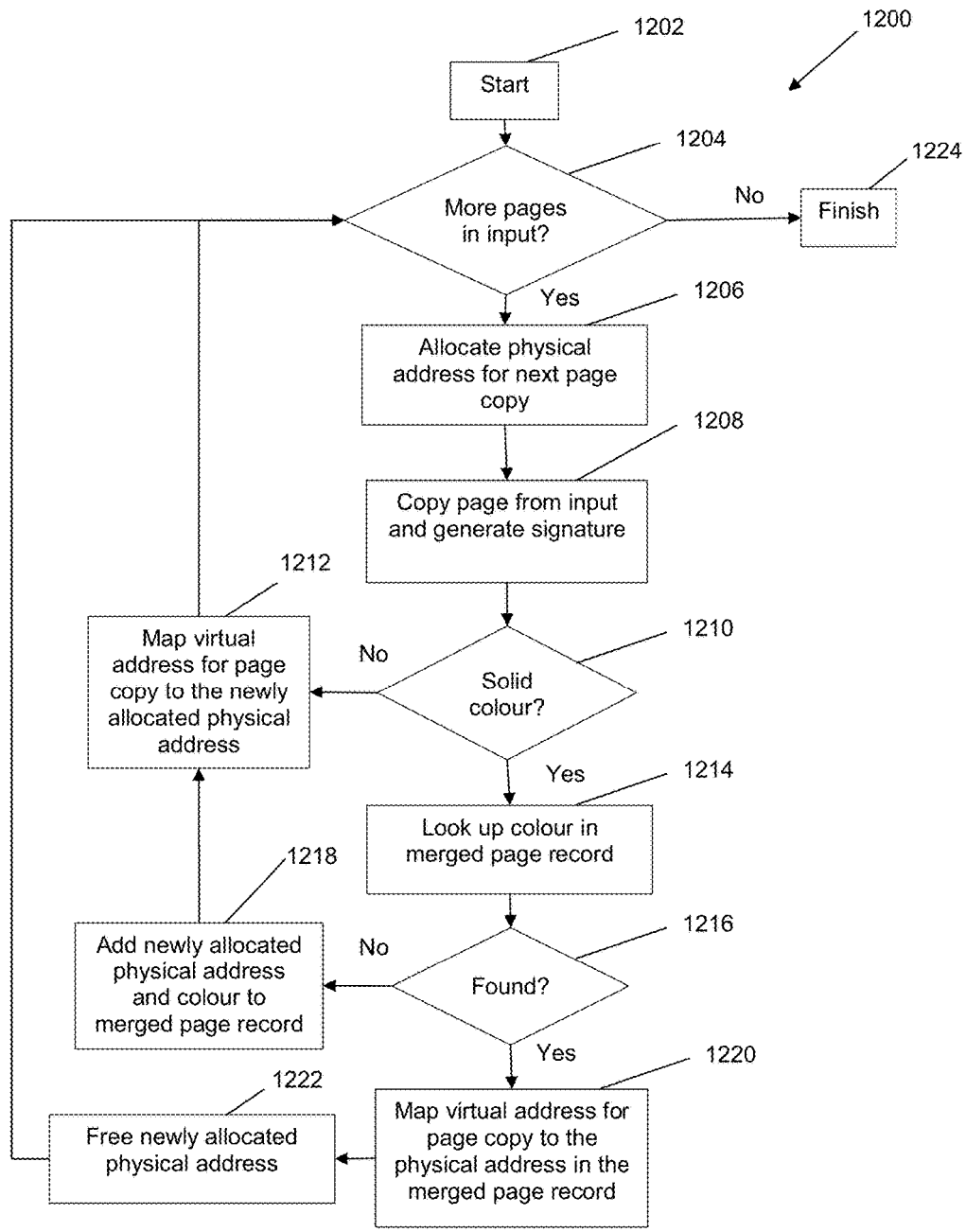
FIG. 12 shows a method of generating metadata and merging pages of a set of graphics data in accordance with further embodiments of the technology described herein.

As will be appreciated, the result of the process 1200 of FIG. 12 is that the virtual memory addresses for pages of the set of graphics data that are determined as being similar to each other are mapped to the same physical memory address in the frame buffer 306 of memory 108.

Figure 13:
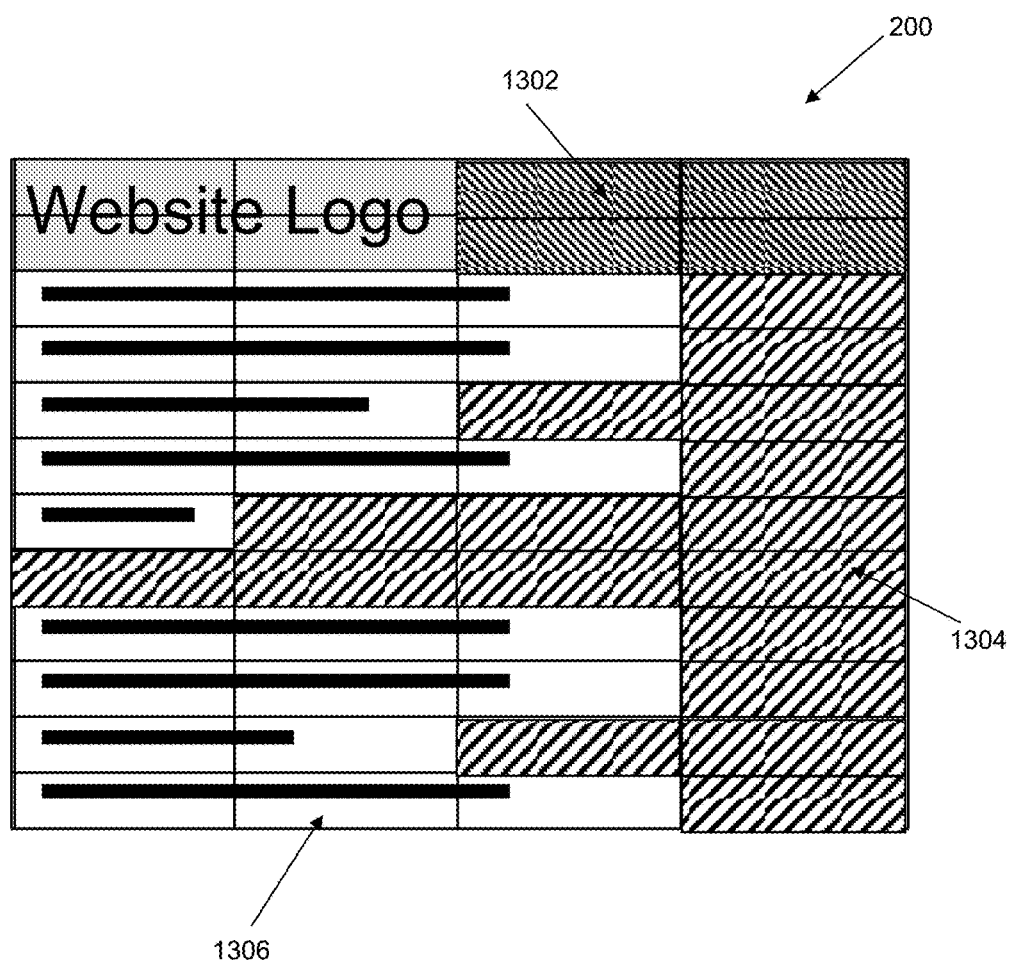
FIG. 13 shows the webpage of FIG. 2 divided into pages of graphics data in accordance with further embodiments of the technology described herein.

In a similar manner to FIG. 10, FIG. 13 shows the webpage 200 of FIG. 2 when divided into the pages of the set of graphics data that are stored in the frame buffer 306 of memory 108. In this embodiment, the webpage is again divided into 12×4 pages. In this embodiment, as is shown in FIG. 10 with different shading, there is again a first set of four merged pages 1302 that are determined as being of a solid grey colour (i.e. the colour of the banner 202 of the webpage 200) and which accordingly have virtual memory address mapped to the same physical memory address in the memory 108. However, in this embodiment, there is a second set of seventeen (rather than fourteen) merged pages 1304 that are determined as being of a solid white colour (i.e. the colour of the background 204 of the webpage 200) and which accordingly have virtual memory address mapped to the same physical memory address in the memory 108. This is because the signatures for the pages themselves, rather than the signatures for tiles corresponding to each of those pages, are considered in the page merging process. There is also again a third set of unmerged pages 1306 that are determined as not being of a solid colour and which therefore have virtual memory address mapped to respective unique physical memory addresses in the memory 108.

In other embodiments, the signature may comprise something other than a colour value or reserved colour value, such as a checksum, a CRC, or a hash value, etc., derived from or generated for the data for the page in question. In these alternative embodiments, step 1210 in FIG. 12 may be replaced with a step of determining a signature for the page in question and steps 1214 and 1218 may refer to that signature rather than a colour.

It can be seen from the above that embodiments of the technology described herein can provide a way to reduce the number of physical memory addresses that are needed for pages of similar graphics data stored in memory. This is achieved, in embodiments of the technology described herein, by determining whether a page of the set of graphics data is similar to a stored page of the set of graphics data. When a particular page of the set of graphics data is determined as being similar to a particular stored page of the set of graphics data, a virtual memory address for the particular page is mapped to the same physical memory address as the particular stored page, for example rather than mapping the virtual memory address for the particular page to a unique physical memory address for the particular page.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system comprising:
   for a plurality of pages, determining whether a page of a set of graphics data stored or to be stored in a memory of the graphics processing system is substantially uniform or solid in terms of data values;
   determining that any of the plurality of pages of the set of graphics data stored or to be stored in the memory of the graphics processing system not being substantially uniform or solid in terms of data values is not similar to any stored pages of the set of graphics data stored in the memory;
   for a page of the set of graphics data stored or to be stored in the memory of the graphics processing system determined as being substantially uniform or solid in terms of data values, determining whether the page of the set of graphics data stored or to be stored in the memory of the graphics processing system is similar to a stored page of the set of graphics data stored in the memory;
   for a page of the set of graphics data stored or to be stored in the memory determined as being similar to a particular stored page of the set of graphics data stored in the memory, mapping a virtual memory address for the page of the set of graphics data stored or to be stored in the memory of the graphics processing system to the same physical memory address as the stored page stored in the memory which is similar to the page of the set of graphics data stored or to be stored in the memory of the graphics processing system.

2. A method as claimed in claim 1, comprising using metadata provided for the set of graphics data to determine whether a page of the set of graphics data stored or to be stored in the memory of the graphics processing system is similar to a stored page of the set of graphics data stored in the memory.

3. A method as claimed in claim 2, comprising generating at least some of the metadata for the set of graphics data prior to at least some or all of the set of graphics data being generated or stored in the memory.

4. A method as claimed in claim 2, comprising:
   generating at least some of the metadata for the set of graphics data while the set of graphics data is being generated; or
   generating at least some of the metadata for the set of graphics data while the set of graphics data is being copied, transferred or written to the memory.

5. A method as claimed in claim 2, wherein the metadata comprises a set of signatures for the set of graphics data, each signature of the set of signatures being representative of the contents of a subregion or page of the set of graphics data.

6. A method as claimed in claim 5, wherein the signature for a subregion or page of the set of graphics data comprises a colour value for the subregion or page.

7. A method as claimed in claim 2, wherein the metadata for the set of graphics data comprises a record of pages of a particular type known to be stored in the memory.

8. A method as claimed in claim 1, wherein the step of determining whether a page of the set of graphics data stored or to be stored in the memory is similar to a stored page of the set of graphics data stored in the memory comprises comparing a signature that is representative of the contents of a page of the set of graphics data stored or to be stored in the memory and a signature that is representative of the contents of a stored page of the set of graphics data stored in the memory.

9. A method as claimed in claim 1, wherein the step of determining whether a page of the set of graphics data stored or to be stored in the memory is substantially uniform or solid in terms of data values comprises determining whether the page stored or to be stored in the memory corresponds to subregions of the set of graphics data that are all similar to one another.

10. A graphics processing system comprising:
    a memory configured to store graphics data;
    memory management unit circuitry configured to access pages of graphics data stored in the memory using virtual memory addresses that map to physical memory addresses in the memory; and
    page merging circuitry configured to:
      determine whether a page of a set of graphics data stored or to be stored in the memory is substantially uniform or solid in terms of data values;
      when the page of the set of graphics data stored or to be stored in the memory is determined as being substantially uniform or solid in terms of data values, determine whether the page of the set of graphics data stored or to be stored in the memory is similar to a stored page of the set of graphics data stored in the memory;
      when the page of the set of graphics data stored or to be stored in the memory is determined as being similar to a stored page of the set of graphics data stored in the memory, map a virtual memory address for the page of the set of graphics data stored or to be stored in the memory to the same physical memory address as the stored page of the set of graphics data stored in the memory;
      when the page of the set of graphics data stored or to be stored in the memory is determined as not being substantially uniform or solid in terms of data values, determine that the page of the set of graphics data stored or to be stored in the memory of the graphics processing system is not similar to any stored pages of the set of graphics data stored in the memory.

11. A graphics processing system as claimed in claim 10, wherein the page merging circuitry is configured to use metadata provided for the set of graphics data to determine whether a page of the set of graphics data stored or to be stored in the memory of the graphics processing system is similar to a stored page of the set of graphics data stored in the memory.

12. A graphics processing system as claimed in claim 11, wherein the graphics processing system comprises processing circuitry configured to generate at least some of the metadata for the set of graphics data prior to at least some or all of the set of graphics data being generated or stored in the memory.

13. A graphics processing system as claimed in claim 11, wherein the graphics processing system comprises processing circuitry configured to:

generate at least some of the metadata for the set of graphics data while the set of graphics data is being generated; or generate at least some of the metadata for the set of graphics data while the set of graphics data is being copied, transferred or written to the memory.

14. A graphics processing system as claimed in claim 11, wherein the metadata comprises a set of signatures for the set of graphics data, each signature of the set of signatures being representative of the contents of a subregion or page of the set of graphics data.

15. A graphics processing system as claimed in claim 14, wherein the signature for a subregion or page of the set of graphics data comprises a colour value for the subregion or page.

16. A graphics processing system as claimed in claim 11, wherein the metadata for the set of graphics data comprises a record of pages of a particular type known to be stored in the memory.

17. A graphics processing system as claimed in claim 10, wherein when the page merging circuitry determines whether a page of the set of graphics data stored or to be stored in the memory is similar to a stored page of the set of graphics data stored in the memory, the page merging circuitry is configured to compare a signature that is representative of the contents of a page of the set of graphics data stored or to be stored in the memory and a signature that is representative of the contents of a stored page of the set of graphics data stored in the memory.

18. A graphics processing system as claimed in claim 10, wherein when the page merging circuitry determines whether a page of the set of graphics data stored or to be stored in the memory is substantially uniform or solid in terms of data values, the page merging circuitry is configured to determine whether the page stored or to be stored in the memory corresponds to subregions of the set of graphics data that are all similar to one another.

19. A non-transitory computer readable storage medium storing computer software code which when executing on a processor of a graphics processing system performs a method comprising:

determining whether a page of a set of graphics data stored or to be stored in a memory of the graphics processing system is substantially uniform or solid in terms of data values;

when it is determined that the page of the set of graphics data stored or to be stored in the memory of the graphics processing system is substantially uniform or solid in terms of data values, determining whether the page of the set of graphics data stored or to be stored in the memory of the graphics processing system is similar to a stored page of the set of graphics data stored in the memory;

when it is determined that the particular page of the set of graphics data stored or to be stored in the memory is similar to a stored page of the set of graphics data stored in the memory, mapping a virtual memory address for the page of the set of graphics data stored or to be stored in the memory to the same physical memory address as the stored page of the set of graphics data stored in the memory;

when it is determined that the page of the set of graphics data stored or to be stored in the memory of the graphics processing system is not substantially uniform or solid in terms of data values, determining that the page of the set of graphics data stored or to be stored in the memory of the graphics processing system is not similar to any stored pages of the set of graphics data stored in the memory.

* * * * *